United States Patent
Tarkin-Tas et al.

(10) Patent No.: US 12,503,593 B2
(45) Date of Patent: Dec. 23, 2025

(54) CURABLE THERMOSETTING COMPOSITION INCLUDING POLY(ARYLENE ETHER) COPOLYMER

(71) Applicant: SHPP GLOBAL TECHNOLOGIES B.V., Bergen op Zoom (NL)

(72) Inventors: Eylem Tarkin-Tas, Delmar, NY (US); Yasser Dhahir, Selkirk, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 487 days.

(21) Appl. No.: 17/924,384

(22) PCT Filed: Jun. 4, 2021

(86) PCT No.: PCT/IB2021/054928
§ 371 (c)(1),
(2) Date: Nov. 10, 2022

(87) PCT Pub. No.: WO2021/245626
PCT Pub. Date: Dec. 9, 2021

(65) Prior Publication Data
US 2023/0183477 A1 Jun. 15, 2023

Related U.S. Application Data

(60) Provisional application No. 63/035,317, filed on Jun. 5, 2020.

(30) Foreign Application Priority Data

Aug. 7, 2020 (EP) ...................................... 20190064

(51) Int. Cl.
*C08L 71/10* (2006.01)
*C08J 3/28* (2006.01)
*C09D 171/10* (2006.01)

(52) U.S. Cl.
CPC ................. *C08L 71/10* (2013.01); *C08J 3/28* (2013.01); *C09D 171/10* (2013.01)

(58) Field of Classification Search
CPC ..... C09D 171/10; C08G 65/485; C08L 71/00; C08F 290/062; C08F 226/06
See application file for complete search history.

(56) References Cited

U.S. PATENT DOCUMENTS

| | | | |
|---|---|---|---|
| 3,018,290 A | 1/1962 | Sauers et al. | |
| 3,553,244 A | 1/1971 | Grigat et al. | |
| 3,562,223 A | 2/1971 | Bargain et al. | |
| 4,211,860 A | 7/1980 | Stenzenberger | |
| 4,211,861 A | 7/1980 | Stenzenberger | |
| 4,304,705 A | 12/1981 | Heilmann et al. | |
| 4,540,763 A | 9/1985 | Kirchhoff | |
| 4,642,329 A | 2/1987 | Kirchhoff et al. | |
| 4,661,193 A | 4/1987 | Kirchhoff et al. | |
| 4,724,260 A | 2/1988 | Kirchhoff et al. | |
| 4,743,399 A | 5/1988 | Kirchhoff et al. | |
| 5,391,650 A | 2/1995 | Brennan et al. | |
| 6,627,704 B2 | 9/2003 | Yeager et al. | |
| 7,192,651 B2 | 3/2007 | Ohno et al. | |
| 7,276,563 B2 | 10/2007 | Ishii et al. | |
| 7,388,057 B2 | 6/2008 | Amagai et al. | |
| 7,393,904 B2 | 7/2008 | Ishii et al. | |
| 2007/0082987 A1 | 4/2007 | Peters et al. | |
| 2009/0062478 A1 | 3/2009 | Carrillo et al. | |
| 2019/0225748 A1* | 7/2019 | Tarkin-Tas | C08G 79/04 |
| 2019/0345324 A1 | 11/2019 | Tarkin-Tas et al. | |
| 2020/0172729 A1 | 6/2020 | Tarkin-Tas et al. | |

FOREIGN PATENT DOCUMENTS

| | | | |
|---|---|---|---|
| EP | 3514195 A1 | 7/2019 | |
| JP | H0753497 A | 2/1995 | |
| JP | 2023529349 A | 7/2023 | |
| WO | 2005040279 A1 | 5/2005 | |
| WO | 2008036454 A1 | 3/2008 | |
| WO | 2008103599 A2 | 10/2008 | |
| WO | 2012135788 A1 | 10/2012 | |
| WO | 2018194798 A1 | 10/2018 | |
| WO | WO-2018194797 A1 * | 10/2018 | ............. B32B 27/20 |

OTHER PUBLICATIONS

Chinese Office Action for Chinese Application No. 202180039947.1; dated May 28, 2024; 14 pages.
Anonymous "Prepreg Technology" by Hexcel Corporation, Mar. 2005, Publication No. FGU 017b (34 pags).
Anonymous, "Advanced Fibre-Reinforced Matrix Products for Direct Processes" by Hexcel Corporation, Jun. 2005, Publication No. ITA 272 (14 pgs).
Griffiths, Farnborough Airshow Report 2006, CompositesWorld.com, Sep. 2006, 2 pages.
International Search Report for International Application No. PCT/IB2021/054927, International filing date Jun. 4, 2021, Date mailied Sep. 23, 2021, 4 pages.
International Search Report for International Application No. PCT/IB2021/054928, International Filing Date Jun. 4, 2021, Date of Mailing Sep. 9, 2021, 4 pages.
Written Opinion for International Application No. PCT/IB2021/054927, International filing date Jun. 4, 2021, Date mailied Sep. 23, 2021, 5 pages.
Written Opinion for International Application No. PCT/IB2021/054928, International Filing Date Jun. 4, 2021, Date of Mailing Sep. 9, 2021, 5 pages.
Non-Final Office Action for U.S. Appl. No. 17/924,386, Date of Mailing: Jul. 11, 2025; 12 pages.

* cited by examiner

*Primary Examiner* — Mark S Kaucher
(74) *Attorney, Agent, or Firm* — CANTOR COLBURN LLP

(57) ABSTRACT

A curable thermosetting composition, comprising a capped poly(arylene ether) copolymer comprising a reactive end group, wherein the capped poly(arylene ether) copolymer is derived from an alkyl, aryl-phenol.

13 Claims, No Drawings

CURABLE THERMOSETTING COMPOSITION INCLUDING POLY(ARYLENE ETHER) COPOLYMER

CROSS-REFERENCE TO RELATED APPLICATIONS

This application is a National Stage application of PCT/IB2021/054928, filed Jun. 4, 2021, which claims the benefit of European Application No. 20190064.4, filed Aug. 7, 2020 and U.S. Provisional Application No. 63/035,317, filed Jun. 5, 2020, all of which are incorporated by reference herein in their entirety.

BACKGROUND

This disclosure relates to curable thermosetting compositions including curable thermosetting compositions, thermosetting compositions, varnish compositions, and articles derived therefrom.

Thermosetting resins are materials that cure to form extremely hard plastics. These materials that can be used in a wide variety of consumer and industrial products. For example, thermosets are used in protective coatings, adhesives, electronic laminates (such as those used in the fabrication of computer circuit boards), flooring, and paving applications, glass fiber-reinforced pipes, and automotive parts (including leaf springs, pumps, and electrical components). Poly(arylene ether) copolymers generally have good dielectric properties. Because of their broad use, particularly in electronic applications, such as laminates for printed circuit boards, it is desirable to provide curable thermosetting compositions including poly(arylene ether) copolymers with a lower viscosity while maintaining or improving the dielectric constant, dissipation factor, heat resistance, and water absorption.

There accordingly remains a need in the art for curable thermosetting compositions including poly(arylene ether) copolymers that have a desirable set of properties. It would be a further advantage if the curable thermosetting compositions had improved dielectric constant, dissipation factor, heat resistance, and water absorption.

BRIEF DESCRIPTION

Provided is a curable thermosetting composition comprising a capped poly(arylene ether) copolymer comprising a reactive end group, wherein the capped poly(arylene ether) copolymer is derived from an alkyl, aryl-phenol.

Also provided are a cured thermoset composition including a cured product of the curable thermosetting composition; a method for the manufacture of the cured thermoset composition including curing the curable thermosetting composition, and an article including the cured thermoset composition of claim 9, wherein the article is a composite, a foam, a fiber, a layer, a coating, an encapsulant, an adhesive, a sealant, a molded component, a prepreg, a casing, a cast article, a laminate, or a combination thereof.

Another aspect provides a varnish composition including the curable thermosetting composition; an article manufactured from the varnish composition; and a method for the manufacture of the article, wherein the method includes impregnating the varnish composition into a substrate to form a prepreg; and curing the varnish composition.

The above described and other features are exemplified by the following detailed description.

DETAILED DESCRIPTION

The present inventors have advantageously discovered that an endcapped poly(arylene ether) copolymer including a repeating unit derived from an alkyl, aryl-phenol can be included in curable thermosetting compositions to achieve improved properties over curable thermosetting compositions that include a poly(arylene ether) copolymer without a repeating unit derived from an alkyl, aryl-phenol. For example, a poly(arylene ether) copolymer including a repeating unit derived from an alkyl, aryl-phenol can provide an improved combination of properties, such as solution viscosity, dissipation factor, resin flow, coefficient of thermal expansion (CTE), and equilibrium water absorption.

Accordingly, an aspect of the present disclosure is a curable thermosetting composition including a capped poly(arylene ether) copolymer comprising reactive end caps, wherein the capped poly(arylene ether) copolymer is derived from an alkyl, aryl-phenol. The alkyl, aryl-phenol can be, for example, a 2-(alkyl)-6-(aryl)phenol such as a 2-($C_{1-12}$ primary or secondary alkyl)-6-(unsubstituted $C_{6-12}$ aryl)phenol. For example, the alkyl, aryl-phenol can be 2-($C_{1-6}$ primary alkyl)-6-(unsubstituted phenyl)phenol.

The capped poly(arylene ether) copolymer includes at least one reactive end group. Exemplary reactive end groups include, but are not limited to, functional groups such as (meth)acrylate, (meth)acrylonitrile, vinyl benzene, allyl, epoxides including glycidyl ether, cyanate ester, amine, maleimide, carboxylic acid, carboxylic acid alkyl ester, or the like. The capped poly(arylene ether) copolymer can be a bifunctional oligomer having reactive end groups at both termini of the oligomer chain. Bifunctional oligomers with functional groups at both termini of the oligomer chains are also referred to as "telechelic" oligomers.

For example, a capped poly(arylene ether) copolymer that is a bifunctional oligomer can include, on average, 1.8 to 2 reactive end groups per molecule, or at least 1.85 reactive end groups per molecule, or at least 1.90 reactive end groups per molecule, or up to 1.99 reactive end groups per molecule, or up to 1.97 hydroxyl groups per molecule.

The capped poly(arylene ether) copolymer can have formula (1) or formula (2):

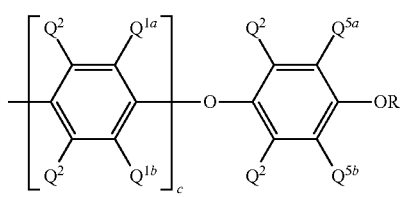

(1)

-continued

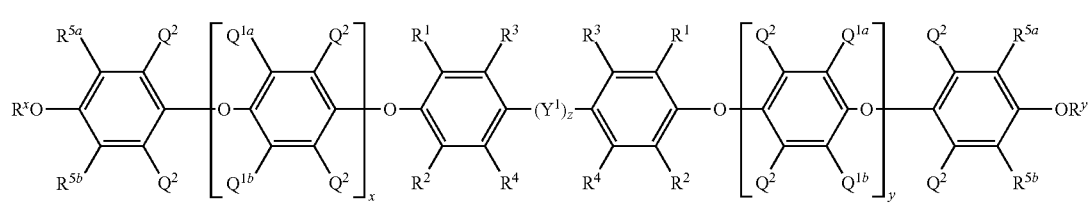

(2)

wherein each occurrence of $Q^{1a}$ and $Q^{1b}$ independently is halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $Q^2$ is independently hydrogen, halogen, unsubstituted or substituted $C_{1-12}$ hydrocarbyl provided that the hydrocarbyl group is not tertiary hydrocarbyl, $C_1$-12 hydrocarbylthio, $C_{1-12}$ hydrocarbyloxy, or $C_{2-12}$ halohydrocarbyloxy wherein at least two carbon atoms separate the halogen and oxygen atoms. For example, each occurrence of $Q^{1a}$ and $Q^{1b}$ independently can be $C_{1-12}$ alkyl, $C_{2-12}$ alkenyl, or $C_{2-12}$ alkynyl.

In formula (2), $R^1$ to $R^4$ are each independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

In formulas (1) and (2), each occurrence of $R^{5a}$ is independently $Q^{1a}$ or a $(C_{1-6}$-hydrocarbyl$)(C_{1-6}$-hydrocarbyl) aminomethylene group and each occurrence of $R^{5b}$ is independently $Q^{1b}$ or a $(C_{1-6}$-hydrocarbyl$)(C_{1-6}$-hydrocarbyl) aminomethylene group, provided that the capped poly (arylene ether) copolymer includes at least one repeating unit wherein $Q^{1a}$ is a $C_{1-12}$ primary or secondary alkyl, and $Q^{1b}$ is unsubstituted $C_{6-12}$ aryl; or at least one terminal unit where $R^{5a}$ is a $C_{1-12}$ primary or secondary alkyl, and $R^{5b}$ is unsubstituted $C_{6-12}$ aryl; or a combination thereof. For example, in an aspect the capped poly(arylene ether) copolymer can include one or more repeating units wherein $Q^{1a}$ is a $C_{1-12}$ primary or secondary alkyl, and $Q^{1b}$ is unsubstituted $C_{6-12}$ aryl.

In formula (1), e is the number of moles of the arylene ether unit.

In formula (2), x and y represent the relative mole ratios of the arylene ether units wherein x and y are each independently 0 to 50, or 0 to 30, or 0 to 20, or 0 to 15, or 0 to 10, or 0 to 8, provided that the sum of x and y is at least 2, or at least 3, or at least 4.

$Y^1$ in the formula (2) is a divalent linking group of any one or more of formulas

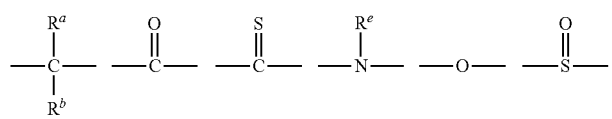

wherein each occurrence of $R^a$, $R^b$, and $R^e$ is independently hydrogen, $C_{1-12}$ hydrocarbyl, or $C_{1-6}$ hydrocarbylene, optionally wherein $R^a$ and $R^b$ together are a $C_{4-8}$ cycloalkylene group; each occurrence of $R^f$ is independently a $C_{1-6}$ hydrocarbylene group; each occurrence of $R^g$ is independently hydrogen, $C_{1-12}$ hydrocarbyl, or $C_{1-12}$ halohydrocarbyl; and n' is 5 to 50.

In formulas (1) and (2), each occurrence of R is independently any one of formulas —Y—$R^{5a}$,

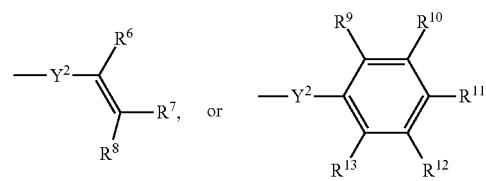

wherein $Y^2$ is a divalent linking group having one of formulas

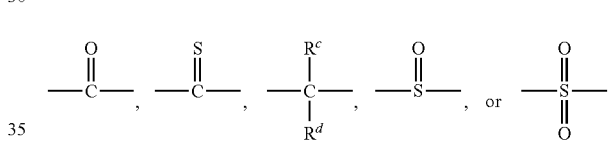

wherein each occurrence of $R^c$ and $R^d$ independently is hydrogen or $C_{1-12}$ alkyl; $R^{5a}$ is an epoxide-containing group, a cyanate-containing group, or a $C_{1-12}$ hydrocarbyl optionally substituted with one or two carboxylic acid groups; each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid; and each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester.

In a specific aspect, each occurrence of $Q^{1a}$ independently is $C_{1-12}$ primary alkyl, or $C_{1-6}$ primary alkyl; each occurrence of $Q^{1b}$ independently is $C_{1-12}$ alkyl or $C_{6-12}$ aryl; or $C_{1-6}$ alkyl or phenyl; $Q^2$ is hydrogen; and $R^1$, $R^2$, $R^3$, and $R^4$ are each independently hydrogen, halogen, or $C_{1-12}$ alkyl; or hydrogen or $C_{1-6}$ alkyl. The capped poly(arylene ether) copolymer includes at least one repeating unit wherein $Q^{1a}$ is the $C_{1-12}$ primary alkyl, and $Q^{1b}$ is the unsubstituted $C_{6-12}$ aryl. For example, the capped poly(arylene ether) copolymer can include one or more repeating units wherein $Q^{1a}$ is $C_{1-6}$ primary alkyl, and $Q^{1b}$ is unsubstituted phenyl.

In another specific aspect, the capped poly(arylene ether) copolymer has formula (2a):

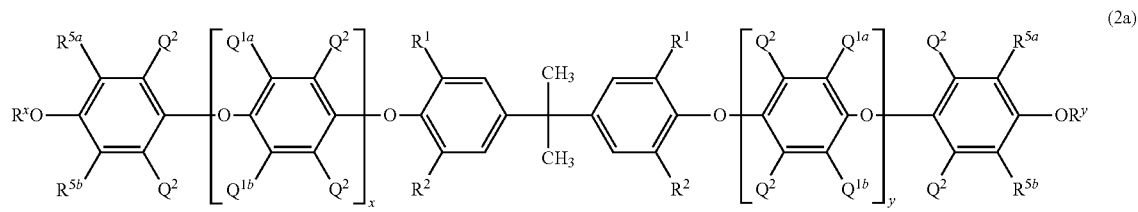

(2a)

wherein $Q^{1a}$, $Q^{1b}$, $Q^2$, $R^1$, $R^2$, $R^{5a}$, $R^{5b}$, $R^x$, $R^y$, x, and y are as defined in formulas (1) and (2); and $R^{1a}$ and $R^{1b}$ are each independently hydrogen, or wherein $R^1$ and $R^2$ are each independently hydrogen or $C_{1-6}$ alkyl. For example, the capped poly(arylene ether) copolymer can be derived from a reaction of the dihydric phenol and 2-methyl-6-phenylphenol.

In another specific aspect, the capped poly(arylene ether) copolymer has formula (2b):

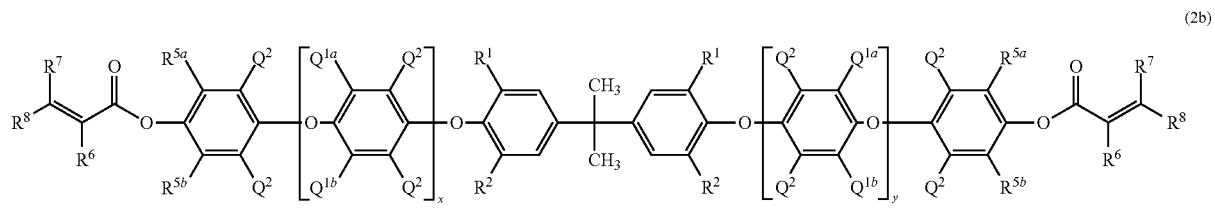

(2b)

wherein $R^1$, $R^2$, $R^6$ to $R^8$, $R^{5a}$, $R^{5b}$, $Q^{1a}$, $Q^{1b}$, $Q^2$, x, and y are as defined in formulas (1) and (2).

Poly(arylene ether) copolymers are the product of oxidative copolymerization of monomers comprising a monohydric phenol or a mixture of monohydric phenols, and optionally a dihydric phenol. The monohydric phenol can be of formula (3):

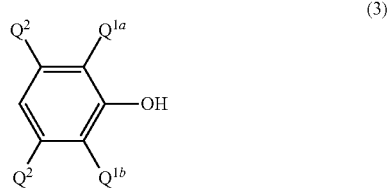

(3)

wherein $Q^{1a}$ and $Q^{1b}$ are as defined for formula (1). Exemplary monohydric phenols include, but are not limited to, 2-methylphenol, 2,5-dimethylphenol, 2,6-dimethylphenol, 2,6-diallylphenol, 2,3,6-trimethylphenol, 2,6-dimethyl-3-allylphenol, 2-methyl-6-phenylphenol, 2-ethyl-6-phenylphenol, 2-allyl-6-methylphenol, 2,6-diphenylphenol, or a combination thereof.

In addition to the monohydric phenol, the monomers can include a dihydric phenol, wherein the dihydric phenol has the structure of formula (4):

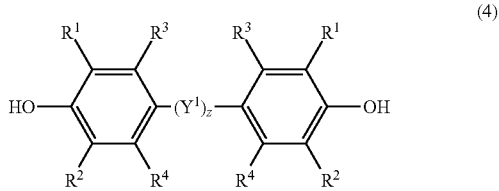

(4)

wherein $R^1$ to $R^4$, $Y^1$, and z are as defined for formula (2).

For example, the dihydric phenol can be 1,1-bis(3,5-dimethyl-4-hydroxy-phenyl)ethane, 1,1-bis(3-chloro-4-hydroxyphenyl)ethane, 1,1-bis(3-methyl-4-hydroxyphenyl)-ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenyl)ethane, 2,2'-binaphthol, 2,2'-biphenol, 2,2'-dihydroxy-4,4'-dimethoxybenzophenone, 2,2'-dihydroxy-4-methoxybenzo-phenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl)propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4- hydroxyphenyl)-1-phenylpropane, 2,2-bis(3-methyl-4-hydroxyphenyl)hexane, 2,2-bis(3-methyl-4-hydroxyphenyl)pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)-methane, bis(4-hydroxy-2,6-dimethyl-3-methoxyphenyl)methane, bis(3,5-dimethyl-4-hydroxyphenyl)methane, bis(3-methyl-4-hydroxyphenyl) methane, bis-(4-hydroxy-3,5-dimethyl phenyl)-cyclohexylmethane, bis(4-hydroxy-3,5-dimethyl phenyl) phenylmethane, bis(3-methyl-4-hydroxyphenyl) cyclohexylmethane, bis(3-methyl-4-hydroxyphenyl) methane, bis(3,5-dimethyl-4-hydroxyphenyl)methane, bis (3-methyl-4-hydroxyphenyl)phenylmethane, 2,2',3,3',5,5'-hexamethyl-4,4'-biphenol, octafluoro-4,4'-biphenol, 2,3,3',5,5'-pentamethyl-4,4'-biphenol, 1,1-bis(3,5-dibromo-4-hydroxyphenyl)cyclohexane 1,1-bis(3,5-dimethyl-4-hydroxyphenyl)cyclohexane, bis(3-methyl-4-hydroxyphenyl)cyclohexane, tetrabromobisphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, 3,3',5,5'-tetramethyl-4,4'-bisphenol sulfone, or a combination thereof.

As disclosed herein, the capped poly(arylene ether) copolymer is derived from an alkyl, aryl-phenol, or for example, the capped poly(arylene ether) copolymer can be derived from a reaction of a dihydric phenol and a monohydric phenol including a 2-(alkyl)-6-(aryl)phenol. For example, the capped poly(arylene ether) copolymer can be the product of oxidative copolymerization of monomers including a monohydric phenol or a mixture of monohydric phenols, and optionally a dihydric phenol in a solvent in the presence of a catalyst. For example, the process for forming the capped poly(arylene ether) copolymer can include oxidatively copolymerizing a 2-(alkyl)-6-(aryl)phenol monomer, optionally one more other monohydric phenol monomers, and a dihydric phenol monomer in a solvent in the presence of a catalyst composition.

The oxidative polymerization can be by continuous addition of oxygen to a reaction mixture comprising the monomers, solvent, and catalyst composition to provide a hydroxyl-terminated poly(arylene ether) copolymer (i.e., an uncapped copolymer) having the structure of formula (1) or (2) and wherein R, $R^x$, and $R^y$ are hydrogen atoms. The molecular oxygen ($O_2$) can be provided as air or pure oxygen. The polymerization catalyst can be a metal complex comprising a transition metal cation. The metal cation can include cations from Group VIB, VIIB, VIIIB, or IB of the periodic table, or a combination thereof, preferably chromium, manganese, cobalt, copper, or a combination thereof. Exemplary metal salts include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate, cuprous benzoate, and the corresponding manganese salts and cobalt salts. Alternatively, it is also possible to add a metal or a metal oxide and an inorganic acid, organic acid, or an aqueous solution of such an acid and form the corresponding metal salt or hydrate in situ. For example, cuprous oxide and hydrobromic acid can be added to generate cuprous bromide in situ.

The polymerization catalyst can further include an amine ligand, for example, a monoamine, an alkylene diamine, or a combination thereof. Monoamines include dialkylmonoamines (such as di-n-butylamine, DBA) and trialkylmonoamines (such as N,N-dimethylbutylamine, DMBA). Diamines include alkylenediamines such as N,N'-di-tert-butylethylenediamine, DBEDA.

Exemplary dialkylmonoamines include dimethylamine, di-n-propylamine, di-n-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl)phenylethanolamine, N-(2,6-dimethyl)phenylethanolamine, N-(p-chloro)phenylethanolamine, N-ethylaniline, N-butyl aniline, N-methyl-2-methylaniline, N-methyl-2,6-dimethylaniline, diphenylamine, or the like, or a combination comprising at least one of the foregoing. Suitable trialkylmonoamines include trimethylamine, triethylamine, tripropylamine, tributylamine, butyldimethylamine, phenyldiethylamine, or a combination thereof.

Exemplary alkylenediamines include those of formula: $(R^{bb})_2N—R—N(R^{bb})_2$, wherein $R^{aa}$ is a substituted or unsubstituted divalent residue; and each $R^{bb}$ is independently hydrogen or $C_{1-8}$ alkyl. In some aspects, two or three aliphatic carbon atoms can form the closest link between the two diamine nitrogen atoms. Specific alkylenediamine ligands include those in which $R^{aa}$ is dimethylene (—CH$_2$CH$_2$—) or trimethylene (—CH$_2$CH$_2$CH$_2$—). $R^{bb}$ can be independently hydrogen, methyl, propyl, isopropyl, butyl, or a $C_{4-8}$ alpha-tertiary alkyl group. Examples of alkylenediamine ligands include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N'-dimethyl-1,3-diaminopropane, N-ethyl-1,3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, or a combination comprising at least one of the foregoing. In some embodiments, the amine ligand is di-n-butylamine (DBA), N,N-dimethylbutylamine (DMBA), N,N'-di-tert-butylethylenediamine (DBEDA), or a combination thereof. The catalyst can be prepared in situ by mixing a metal ion source (e.g., cuprous oxide and hydrobromic acid) and amine ligands. For example, the polymerization catalyst can include a copper ion, a bromide ion, and N,N'-di-tert-butylethylenediamine.

The hydroxy-terminated poly(arylene ether) copolymer can be reacted with a capping agent to provide the capped poly(arylene ether) copolymer. The capping agent is not particularly limited, and can be a compound including unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, an allylhydroxypropyl, or a combination thereof. The person of skill in the art can select a capping agent based on the desired functionality of the capped poly(arylene ether) copolymer. For example, a vinyl benzyl ether end group can be prepared using a curing agent that is a vinyl benzyl halide (e.g., vinyl benzyl chloride), a (meth) acrylic end group can be prepared using a curing agent that is a (meth)acrylic acid halide or a (meth)acrylic anhydride.

The capped poly(arylene ether) copolymer can include structural units derived from the monohydric phenol and the dihydric phenol in a mole ratio of 3:1 to 110:1. Within this range, the ratio can be at least 3.5:1, or at least 5:1, or at least 7:1, or up to 50:1, or up to 25:1.

In some aspects, the capped poly(arylene ether) copolymer can be a poly(arylene ether)-polysiloxane block copolymer, which as used herein, refers to a block copolymer comprising at least one poly(arylene ether) block and at least one polysiloxane block.

The poly(arylene ether)-polysiloxane block copolymer can prepared by an oxidative copolymerization method including oxidatively copolymerizing a monomer mixture comprising a monohydric phenol and a hydroxyaryl-terminated polysiloxane. For example, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-terminated polysiloxane can comprise a plurality of repeating units having the structure of formula (5):

(5)

wherein each occurrence of $R^{22}$ and $R^{33}$ is independently hydrogen, $C_{1-12}$ hydrocarbyl, or $C_{1-12}$ halohydrocarbyl; and two terminal units having the structure of formula (5a):

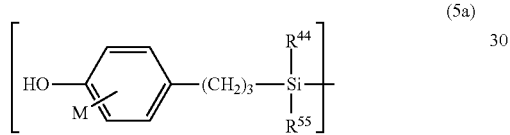

(5a)

wherein M is hydrogen, $C_{1-12}$ hydrocarbyl, $C_{1-12}$ hydrocarbyloxy, or halogen, and wherein each occurrence of $R^{44}$ and $R^{45}$ is independently hydrogen, $C_{1-12}$ hydrocarbyl or $C_{1-12}$ halohydrocarbyl. In a specific aspect, each occurrence of $R^8$ and $R^9$ is methyl, and Y is methoxy.

For example, the monohydric phenol can be 2,6-dimethylphenol, and the hydroxyaryl-terminated polysiloxane has the structure of formula (5b):

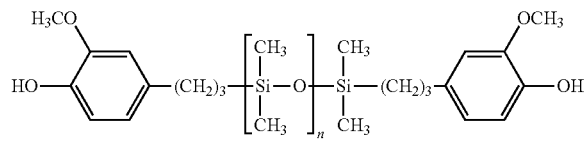

(5b)

wherein n is, on average, 5 to 100, or 5 to 45, or 30 to 60. Accordingly, the structural fragment of the capped poly(arylene ether) copolymer having the formula (6):

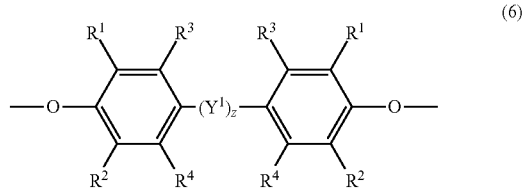

(6)

can be of the formula (6a):

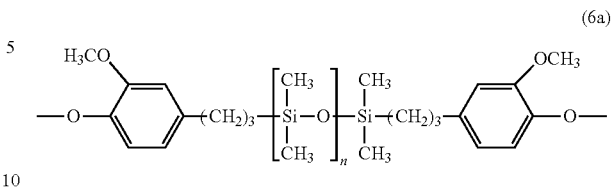

(6a)

wherein n is 5-100, or 5-45, or 30-60.

The capped poly(arylene ether) copolymer can also include 10 to 70 mole percent of copolymer chains comprising a terminal unit derived from the dihydric phenol. For example, when the dihydric phenol is 2,2-bis(3,5-dimethyl-4-hydroxyphenyl)propane, the poly(arylene ether) copolymer can include 10 to 70 mole percent of copolymer chains comprising a terminal unit having the structure of formula (7):

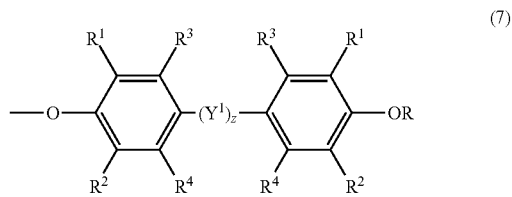

(7)

wherein $R^1$ to $R^4$, $Y^1$, and z are as provided in formula (1) or (2), and R is $R^x$ or $R^y$.

In an aspect, the capped poly(arylene ether) copolymer can have an intrinsic viscosity of 0.03 to 0.13 deciliter per gram (dL/g), or 0.03 to 0.18 dL/g, or 0.04 to 0.15 dL/g at 25° C. in chloroform using an Ubbelohde viscometer. The capped poly(arylene ether) copolymer can have a weight average molecular weight ($M_w$) of 500 to 50,000 g/mol, or 1,000 to 25,000 g/mol, or 1,500 to 12,500 g/mol, as determined by gel permeation chromatography (GPC) using polystyrene standards. The capped poly(arylene ether) copolymer can have a number average molecular weight ($M_n$) of 500 to 10,000 grams per mole (g/mol), or 750 to 5,000 g/mol, or 500 to 40.00 g/mol, as determined by GPC using polystyrene standards. In some aspects, the capped poly(arylene ether) copolymer has a ratio of $M_w$ to $M_n$ (also referred to as "polydispersity" of 1.9 to 3, or at least 2, or up to 2.8, or up to 2.6, or up to 2.4.

The capped poly(arylene ether) copolymer can be present in the curable thermosetting composition in an amount of 1 to 95 weight percent (wt %), or 5 to 95 wt %, or 10 to 85 wt %, or 20 to 80 wt %, 30 to 70 wt %, or 5 to 30 wt %, or 5 to 15 wt %, based on the total weight of the curable thermosetting composition.

The curable thermosetting composition can optionally further include one or more of one or more of a crosslinking agent, a curing agent, a curing catalyst, a curing initiator, or a combination thereof. In some aspects, the curable thermosetting composition can further include one or more of a flame retardant, a filler, a coupling agent, or a combination thereof. For example, the curable thermosetting composition can include one or more of a crosslinking agent, a curing agent, a curing catalyst, a curing initiator, or a combination thereof; and can further include one or more of a flame retardant, a filler, a coupling agent, or a combination thereof. For example, the curable thermosetting composition can include one or more of a crosslinking agent, a curing agent, a curing catalyst, a curing initiator, or a combination thereof; and can include one or more of a flame retardant, a filler, a coupling agent, or a combination thereof.

There is considerable overlap among thermosetting resins, crosslinking agents, and coupling agents. As used herein, the term "crosslinking agent" includes compounds that can be used as thermosetting resins, crosslinkers, coupling agents, or a combination thereof. For example, in some instances a compound that is a thermosetting resin could also be used as a crosslinking agent, a coupling agent, or both.

The thermosetting resins are not particularly limited, and thermosetting resins can be used alone or in combinations of two or more thermosetting resins. Exemplary thermosetting resins include, but are not limited to, epoxy resins, cyanate ester resins, (bis)maleimide resins, (poly)benzoxazine resins, vinyl resins (e.g., a vinyl benzyl ether resin), phenolic resins, alkyd resins, unsaturated polyester resins, arylcyclobutene resins, perfluorovinyl ether resins, monomers, oligomers or polymers with curable unsaturation (e.g., a vinyl functionality), or a combination thereof.

The epoxy resin can generally be any epoxy resin that is suitable for use in thermosetting resins. The term "epoxy resin" in this context refers to a curable composition of oxirane rig-containing compounds as described in, for example, C. A. May, Epoxy Resins, 2.sup.nd Edition, (New York & Basle: Marcel Dekker Inc.), 1988. The epoxy resins can be, for example, bisphenol A type epoxy resins such as those obtained from bisphenol A and resins obtained by substituting at least one position of the 2-position, the 3-position and the 5-position of bisphenol A with a halogen atom, an alkyl group having 6 or less carbon atoms or a phenyl group; bisphenol F type epoxy resins such as those obtained from bisphenol F and a resin obtained by substituting at least one position of the 2-position, the 3-position and the 5-position of bisphenol F with a halogen atom, an alkyl group having 6 or less carbon atoms or a phenyl group; glycidyl ether compounds derived from bivalent or tri- or more-valent phenols such as hydroquinone, resorcinol, tris-4-(hydroxyphenyl)methane and 1,1,2,2-tetrakis(4-hydroxyphenyl)ethane; a novolak type epoxy resin derived from a novolak resin which is a reaction product between phenols such as phenol and o-cresol and formaldehyde, including bisphenol A novolak type epoxy resins and cresol novolak type epoxy resins; cyclic aliphatic epoxy compounds such as 2,2-bis(3,4-epoxycyclohexyl)propane, 2,2-bis[4-(2,3-epoxypropyl)-cyclohexyl]propane, vinylcyclohexene dioxide, 3,4-epoxycyclohexylmethyl-3,4-epoxycyclo-hexane carboxylate; dicyclopentadiene-containing polyepoxides; amine type epoxy resins derived from aniline, p-aminophenol, m-aminophenol, 4-amino-m-cresol, 6-amino-m-cresol, 4,4'-diaminodiphenylmethane, 3,3'-diaminodiphenylmethane, 4,4'-diaminodiphenylether, 3,4'-diaminodiphenylether, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxy-phenyl)propane, p-phenylenediamine, m-phenylenediamine, 2,4-toluenediamine, 2,6-toluenediamine, p-xylylenediamine, m-xylylenediamine, 1,4-cyclohexane-bis(methylamine), 5-amino-1-(4'-aminophenyl)-1,3,3-trimethylindane, 6-amino-1-(4'-aminophenyl)-1,3,3-trimethylindane or the like; heterocyclic epoxy compounds, and glycidyl ester type epoxy compounds, for example, those derived from glycidyl ester of aromatic carboxylic acids such as p-oxybenzoic acid, m-oxybenzoic acid, terephthalic acid, or isophthalic acid. The term "epoxy resin" can also include reaction products of compounds containing two or more epoxy groups and aromatic dihydroxy compounds, which can be optionally halogen-substituted.

Cyanate esters are not limited, and any resin composed of cyanate ester monomers, which polymerize to form a polymer containing a plurality of cyanate ester (—OCN) functional groups can be used. Cyanate ester monomers, prepolymers (i.e., partially polymerized cyanate ester monomers or blends of cyanate ester monomers), homopolymers, and copolymers made using cyanate ester precursors, and combinations of these compounds. For example, cyanate esters can be prepared according to methods as disclosed in "Chemistry and Technology of Cyanate Ester Resins", by Ian Hamerton, Blackie Academic and Professional; U.S. Pat. No. 3,553,244, and JP-A-7-53497. Exemplary cyanate ester resins include, but are not limited to, 2,2-bis(4-cyanatophenyl)propane, bis(4-cyanatophenyl)ethane, bis(3,5-dimethyl-4-cyanatophenyl)methane, 2,2-bis(4-cyanatophenyl)-1,1,1,3,3,3-hexafluoropropane, α,α'-bis(4-cyanatophenyl)-m-diisopropylbenzene, cyanate ester resins prepared from dicyclopentadiene-phenol copolymers, and prepolymers prepared from these monomers. An example of a prepolymer is PRIMASET BA-230S (Lonza). The cyanate ester prepolymers can be homopolymers or can be copolymers that incorporate other monomers. Examples of such copolymers include BT resins available from Mitsubishi Gas Chemical, such as, BT 2160 and BT2170, which are prepolymers made with cyanate ester monomers and bismaleimide monomers. Other examples of cyanate esters polymers, monomers, prepolymers, and blends of cyanate ester monomers with other non-cyanate ester monomers include those disclosed in, for example, U.S. Pat. Nos. 7,393,904, 7,388,057, 7,276,563, and 7,192,651.

Bismaleimide resins can be produced by reaction of a monomeric bismaleimide with a nucleophile such as a diamine, aminophenol, or amino benzhydrazide, or by reaction of a bismaleimide with diallyl bisphenol A. Exemplary bismaleimide resins include 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimido-diphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimido-pyridine, 1,3-bis(maleimidomethyl)cyclohexane, 1,3-bis(maleimidomethyl)-benzene, 1,1-bis(4-maleimidophenyl)cyclohexane, 1,3-bis(dichloromaleimido)benzene, 4,4'-bis(citracon-imido)diphenylmethane, 2,2-bis(4-maleimidophenyl)propane, 1-phenyl-1,1-bis(4-maleimidophenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethane-bismaleimide, N,N'-4,4'-diphenyl-etherbismaleimide, N,N'-4,4'-diphenylsufonebismaleimide, N,N'-4,4'-dicyclohexylmethane-bismaleimide, N,N'-α,α'-4,4'-dimethylenecyclohexane-bismaleimide, N,N'-m-methaxylenebismaleimide, N,N'-4,4'-diphenylcyclohexanebismaleimide, and N,N'-methylene-bis(3-chloro-p-phenylene)bismaleimide, as well as the maleimide resins disclosed in U.S. Pat. Nos. 3,562,223; 4,211,860; and 4,211,861. Bismaleimide resins can be prepared by methods known in the art, as described, for example, in U.S. Pat. No. 3,018,290.

The benzoxazine compounds have a benzoxazine ring in the molecule. Exemplary benzoxazine monomers can be prepared from the reaction of aldehydes, phenols, and primary amines with or without solvent. The phenolic compounds for forming benzoxazines include phenols and polyphenols. The use of polyphenols with two or more hydroxyl groups reactive in forming benzoxazines can result in branched, crosslinked, or a combination of branched and crosslinked products. The groups connecting the phenolic groups into a phenol can be branch points or connecting groups in the polybenzoxazine.

Exemplary phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydrooxynapthalene, 2-(diphenylphosphoryl)hydroquinone, 2,2'-biphenol, 4,4-biphenol, 4,4'-isopropylidenediphenol (bisphenol A), 4,4'-isopropylidenebis-(2-methylphenol), 4,4'-isopropylidenebis(2-allylphenol), 4,4'(1,3-phenylenediisopropylidene)-bisphenol, 4,4'-isopropylidenebis(3-phenylphenol) 4,4'-(1,4-phenylenediisoproylidene)-bisphenol, 4,4'-ethylidenediphenol, 4,4'oxydiphenol, 4,4'thiodiphenol, 4,4'-sufonyldiphenol, 4,4'-sulfinyldiphenol, 4,4'-hexafluoroisoproylidene)bisphenol, 4,4'(1-phenylethylidene)bisphenol, bis(4-hydroxyphenyl)-2,2-dichloroethylene, bis(4-hydroxyphenyl)methane (Bisphenol F), 4,4'-(cyclopentylidene)diphenol, 4,4'-(cyclohexylidene)diphenol, 4,4'-(cyclododecylidene)-diphenol 4,4'-(bicyclo[2.2.1]heptylidene)diphenol, 4,4'-(9H-fluorene-9,9-diyl)diphenol, iso-propylidenebis(2-allylphenol), 3,3-bis(4-hydroxyphenyl)isobenzofuran-1(3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone, tris(4-hydroxyphenyl)methane, tris(4-hydroxyphenyl)ethane, tris(4-hydroxyphenyl)propane, tris(4-hydroxyphenyl) butane, tris(3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, or the like.

The aldehydes used to form the benzoxazine can be any aldehyde, such as an aldehyde having 1 to 10 carbon atoms. For example, the aldehyde can be formaldehyde. The amine used to form the benzoxazine can be an aromatic amine, an aliphatic amine, an alkyl substituted aromatic, or an aromatic substituted alkyl amine. The amine can be a polyamine, for example to prepare polyfunctional benzoxazine monomers for crosslinking.

The amines for forming benzoxazines generally have 1 to 40 carbon atoms unless they include aromatic rings, and then they can have 6 to 40 carbon atoms. The amine of di- or polyfunctional can be a branch point to connect one polybenzoxazine to another.

In some examples, thermal polymerization at 150 to 300° C. can be used for polymerizing benzoxazine monomers. The polymerization can be done in bulk, from solution, or otherwise. Catalysts, such as carboxylic acids, can be used to reduce the polymerization temperature or accelerate the polymerization rate at the same temperature.

Vinyl benzyl ether resins can be prepared from condensation of a phenol with a vinyl benzyl halide, such as vinyl benzyl chloride. Bisphenol A and trisphenols and polyphenols are generally used to produce poly(vinylbenzyl ethers) which can be used to produce crosslinked thermosetting resins. Exemplary vinyl benzyl ethers can include those vinylbenzyl ethers produced from reaction of a vinyl halide with resorcinol, catechol, hydroquinone, 2,6-dihydroxy naphthalene, 2,7-dihydroxynaphthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol, 4,4'-isopropylidenebis(2,6-dibromophenol), 4,4'-isopropylidenebis(2,6-dimethylphenol), 4,4'-isopropylidenebis(2-methylphenol), 4,4'-isopropylidenebis(2-allylphenol), 4,4'-(1,3-phenylenediisopropylidene)bisphenol, 4,4'-isopropylidenebis(3-phenylphenol) 4,4'-(1,4-phenylenediisoproylidene)bisphenol, 4,4'-ethylidenediphenol, 4,4'-oxydiphenol, 4,4'-thiodiphenol, 4,4'-thiobis(2,6-dimethylphenol), 4,4'-sufonyldiphenol, 4,4'-sulfonylbis(2,6-dimethylphenol) 4,4'-sulfinyldiphenol, 4,4'-hexafluoroisoproylidene)bisphenol, 4,4'(1-phenylethylidene)bisphenol, bis(4-hydroxyphenyl)-2,2-dichloroethylene, bis(4-hydroxyphenyl)methane, bis(2,6-dimethyl-4-hydroxyphenyl)methane, 4,4'-(cyclopentylidene)diphenol, 4,4'-(cyclohexylidene)diphenol, 4,4'-(cyclododecylidene)diphenol 4,4'-(bicyclo[2.2.1]-heptylidene)diphenol, 4,4'-(9H-fluorene-9,9-diyl)diphenol, 3,3-bis(4-hydroxyphenyl)-isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol, dihydroxybenzophenone, tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxy-phenyl)methane, tetrakis(4-hydroxyphenyl)ethane, tetrakis(3,5-dimethyl-4-hydroxyphenyl)-ethane, bis(4-hydroxyphenyl)phenylphosphine oxide, dicyclopentadienylbis (2,6-dimethyl phenol), dicyclopentadienyl bis(ortho-cresol), dicyclopentadienyl bisphenol, or the like.

Arylcyclobutenes include those derived from compounds of the structure

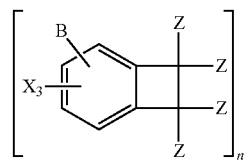

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_{6-20}$ phenolic compounds); each occurrence of X is independently hydroxy or $C_{1-24}$ hydrocarbyl (including linear and branched alkyl and cycloalkyl); and each occurrence of Z is independently hydrogen, halogen, or $C_{1-12}$ hydrocarbyl; and n is 1 to 1000, or 1 to 8, or n is 2, 3, or 4. Other exemplary arylcyclobutenes and methods of arylcyclobutene synthesis can be found in U.S. Pat. Nos. 4,743,399, 4,540,763, 4,642,329, 4,661,193, 4,724,260, and 5,391,650.

Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether)s. Phenols useful in their synthesis include resorcinol, catechol, hydroquinone, 2,6-dihydroxy naphthalene, 2,7-dihydroxynapthalene, 2-(diphenyl-phosphoryl) hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol, 4,4'-isopropylidenebis(2,6-dibromophenol), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol, 4,4'-isopropylidenebis(3-phenylphenol) 4,4'-(1,4-phenylenediisoproylidene)bisphenol, 4,4'-ethylidenediphenol, 4,4'-oxydiphenol, 4,4'-thiodiphenol, 4,4'-thiobis(2,6-dimethylphenol), 4,4'-sufonyldiphenol, 4,4'-sulfonylbis(2,6-dimethylphenol) 4,4'-sulfinyldiphenol, 4,4'-hexa-fluoroisoproylidene)bisphenol, 4,4'(1-phenylethylidene)bisphenol, bis(4-hydroxyphenyl)-2,2-dichloroethylene, bis(4-hydroxyphenyl)methane, bis(2,6-dimethyl-4-hydroxyphenyl)methane, 4,4'-(cyclopentylidene)diphenol, 4,4'-(cyclohexylidene)diphenol, 4,4'-(cyclododecylidene)-diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol, dihydroxybenzophenone, tris(4-hydroxyphenyl)methane, tris(4-hydroxyphenyl)ethane, tris(4-hydroxyphenyl)-propane, tris (4-hydroxyphenyl)butane, tris(3-methyl-4-hydroxyphenyl) methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol), or the like.

Crosslinking agents, which also include auxiliary crosslinking agents, are not particularly limited. The crosslinking agents can be used alone or in combinations of two or more different crosslinking agents. Exemplary crosslinking agents and auxiliary crosslinking agents include oligomers or polymers with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (e.g., ethylene-α-olefin copolymers obtained by copolymerizing ethylene, an α-olefin, and a diene, such as ethylene-propylene-diene terpolymer (EPDM) and ethylene-butene-diene terpolymer (EBDM)). Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber.

Further examples include various liquid rubbers, for example several types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene.

Polybutadiene resins containing elevated levels of 1,2 addition are desirable for thermosetting matrices. Examples include the functionalized polybutadienes and poly(butadiene-styrene) random copolymers sold by Ricon Resins, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17. Also included are polybutadienes that can be used to improve adhesion including RICOBOND 1031, RICOBOND 1731, RICOBOND 2031, RICACRYL 3500, RICOBOND 1756, RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 01731HS, and RICOBOND 1756HS. Further butadiene resins include poly(butadiene-isoprene) block and random copolymers, such as those with molecular weights from 3,000 to 50,000 g/mol and polybutadiene homopolymers having molecular weights from 3,000 to 50,000 g/mol. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether (meth)acrylate resin, polyalcohol (meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resins. For example, the crosslinking agent. Other exemplary crosslinking agents include polyfunctional crosslinking monomers such as (meth)acrylate monomers having two or more (meth)acrylate moieties per monomer molecule. Exemplary polyfunctional monomers include di(meth)acrylates, e.g., 1,6-hexanediol di(meth)acrylate, 1,4-cyclohexanediol di(meth)acrylate, tripropylene glycol di(meth)acrylate, neopentyl glycol di(meth)acrylate, neopentyl glycol propoxylate di(meth)acrylate, neopentyl glycol ethoxylate di(meth) acrylate, neopentyl glycol propoxylate di(meth)acrylate, neopentyl glycol ethoxylate di(meth)acrylate, polyethylene glycol di(meth)acrylate, glycerol di(meth)acrylate, or the like; tri(meth)acrylates such as trimethylol-propane tri(meth)acrylate, 1,2,4-butanetriol tri(meth)acrylate, trimethylol-propane ethoxylate tri(meth)acrylate, or the like; tri(meth)allyls such as tri(meth)allyl cyanurate, tri(meth)allyl isocyanurate, tri(meth)allyl esters of citric acid, tri(meth)allyl esters of phosphoric acid, pentaerythritol tri(meth)acrylate, tris(hydroxyethyl)isocyanurate tri(meth)acrylate, or the like; tetra(meth)acrylates such as pentaerythritol tetra(meth)acrylate or the like; penta(meth)acrylates such as dipentaerythritol penta(meth)acrylate, or the like; hexa(meth)acrylates such as dipentaerythritol hexa(meth)acrylate, sorbitol hexa(meth)acrylate, or the like; glycidyl compounds such as glycidyl (meth)acrylate, (meth)allyl glycidyl ether, 1-chloro-2,3-epoxypropyl (meth)acrylate, 2-bromo-3,4-epoxybutyl (meth)acrylate, 2-(epoxyethyloxy)-ethyl (meth)acrylate, 2-(3,4-epoxybutyloxy)ethyl (meth)acrylate, or the like; polythiol compounds such as trimethylolpropane tris(mercaptopropionate), pentaerythritol tetrakis(3-mercaptopropionate), or the like; silanes such as tetramethoxysilane, tetraethoxysilane, tetrapropoxy-silane, tetra-n-butoxysilane, vinyltris(methylethyloximino)silane, vinyltris-(acetoxime)silane, methyltris(methylethyloximino)silane, methyltris(acetoxime)silane, vinyltrimethoxysilane, methyltrimethoxysilane, vinyltris(isopropenoxy)silane, tetraacetoxysilane, methyltriacetoxy-silane, ethyltriacetoxysilane, vinyltriacetoxysilane, di-t-butoxy-diacetoxysilane, methyltris(ethyl lactate)silane, vinyltris(ethyl lactate)silane, or the like; carbodiimides such as N-(3-dimethyl-aminopropyl)-N'-ethyl-carbodiimide hydrochloride, dicyclohexylcarbodiimide, or a combination thereof. The curable thermosetting composition can optionally include a crosslinking catalyst, such as a carboxylic acid salt.

When the curable thermosetting composition includes a crosslinking agent, the crosslinking agent can be included in an amount of 1 to 60 wt %, or 5 to 45 wt %, or 10 to 30 wt %, based on total weight of the curable thermosetting composition.

The curable thermosetting composition can include one or more curing agents, which includes compounds that may be described as curing agents, hardeners, or as both.

Exemplary curing agents and hardeners include amines, alcohols, phenols, carboxylic acids, acid anhydrides, or the like. For example, phenolic hardeners include novolac type phenol resins, resole type phenol resins, cresol novolac resins, aralkyl type phenol resins, phenol aralkyl resins, cresol aralkyl resins, naphthol aralkyl resins, dicyclopentadiene type phenol resins, terpene modified phenol resins, biphenyl type phenol resins, biphenyl-modified phenol aralkyl resins, bisphenols, triphenylmethane type phenol resins, tetraphenylol ethane resins, naphthol novolac resins, naphthol-phenol co-condensed novolac resins, naphthol-cresol co-condensed novolac resins, amino triazine modified phenol resins, or a combination thereof. Examples of the anhydride hardeners include methylhexahydrophthalic anhydride (MHHPA), methyltetrahydrophthalic anhydride, styrene-maleic anhydride copolymers (SMA), and olefin-maleic anhydride copolymers such as maleic anhydride grafted polyethylene, maleic anhydride grafted polypropylene, or a combination thereof. Other curing agents and hardeners include compounds such as dicyandiamides, polyamides, amidoamines, phenalkamines, Mannich bases, anhydrides, phenol-formaldehyde resins, amine-formaldehyde resins, phenol-formaldehyde resins, carboxylic acid functional polyesters, polysulfides, polymercaptans, isocyanates, cyanate ester compounds, or any combination thereof.

Other exemplary curing agents include tertiary amines, Lewis acids, and oligomers or polymers with unsaturation.

When the curable thermosetting composition includes a curing agent, the curing agent can be included in an amount of 0.01 to 50 wt %, or 0.1 to 30 wt %, or 0.1 to 20 wt %, based on total weight of the curable thermosetting composition.

The curable thermosetting composition can include a curing catalyst, includes compounds that are also described as curing accelerators, curing promoters, curing catalysts, and curing co-catalysts.

Exemplary curing accelerators include heterocyclic accelerators such as a substituted or unsubstituted $C_{3-6}$ heterocycle comprising 1 to 4 ring heteroatoms, wherein each heteroatom is independently the same or different, and is nitrogen, oxygen, phosphorus, silicon, or sulfur. Heterocyclic accelerators include benzotriazoles; triazines; piperazines such as amino-ethylpiperazine, N-(3-aminopropyl)piperazine, or the like; imidazoles such as 1-methylimidazole, 2-methylimidazole, 3-methyl imidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole; cyclic amidine such as 4-diazabicyclo(2,2,2)-octane, diazabicycloundecene, 2-phenyl imidazoline, or the like; N,N-dimethylaminopyridine; a sulfamidate; or a combination thereof.

Amine curing accelerators include isophoronediamine, triethylenetetraamine, diethylenetriamine, 1,2- and 1,3-diaminopropane, 2,2-dimethylpropylenediamine, 1,4-diaminobutane, 1,6-diaminohexane, 1,7-diaminoheptane, 1,8-diaminooctane, 1,9-diaminononane, 1,12-diaminododecane, 4-azaheptamethylenediamine, N,N'-bis(3-amino-propyl)butane-1,4-diamine, dicyanamide, diamide diphenylmethane, diamide diphenylsulfonic acid (amine adduct), 4,4'-methylenedianiline, diethyltoluenediamine, m-phenylenediamine, p-phenylenediamine, melamine formaldehyde resins, urea formaldehyde resins, tetraethylenepentamine, 3-diethylaminopropylamine, 3,3'-iminobispropylamine, 2,4-bis(p-aminobenzyl)aniline, tetraethylenepentamine, 3-diethylaminopropylamine, 2,2,4- and 2,4,4-trimethylhexamethylenediamine, 1,2- and 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diminocyclohexane, 4,4'-diaminondicyclohexylmethane, 4,4'-diaminodicyclohexylpropane, 2,2-bis(4-aminocyclohexyl)propane, 3,3'-dimethyl-4,4'-diaminodicyclohexylmethane, 3-amino-1-cyclohexaneaminopropane, 1,3- and 1,4-bis(aminomethyl)cyclohexane, m- and p-xylylenediamine, or diethyl toluene diamines; or a tertiary amine hardening accelerator such as triethylamine, tributylamine, dimethylaniline, diethylaniline, benzyldimethylamine (BDMA), α-methylbenzyldimethylamine, N,N-dimethyl amino pyridine, N,N-dimethylaminoethanol, N,N-dimethylaminocresol, or tri(N,N-dimethylaminomethyl)phenol; or a combination thereof.

The curing accelerator can be a latent cationic cure catalyst including, for example, diaryliodonium salts, phosphonic acid esters, sulfonic acid esters, carboxylic acid esters, phosphonic ylides, triarylsulfonium salts, benzylsulfonium salts, aryldiazonium salts, benzylpyridinium salts, benzylammonium salts, isoxazolium salts, or a combination thereof. The diaryliodonium salt can have the structure $[(R^{10})(R^{11})I]+X^-$, wherein $R^{10}$ and $R^{11}$ are each independently a $C_{6-14}$ monovalent aromatic hydrocarbon radical, optionally substituted with from 1 to 4 monovalent radicals selected from $C_{1-20}$ alkyl, $C_{1-20}$ alkoxy, nitro, and chloro; and wherein X— is an anion. The additional cure accelerator can have the structure $[(R^{10})(R^{11})I]^+SbF_6^-$, wherein $R^{10}$ and $R^{11}$ are each independently a $C_{6-14}$ monovalent aromatic hydrocarbon, optionally substituted with from 1 to 4 $C_{1-20}$ alkyl, $C_{1-20}$ alkoxy, nitro, or chloro; for example, 4-octyloxyphenyl phenyl iodonium hexafluoroantimonate.

The curing accelerator can be a metal salt complex, such as a copper (II) aluminum (III), zinc, cobalt, tin salt of an aliphatic or aromatic carboxylic acid, or a copper (II), tin (II), and aluminum (III) salt of acetate, stearate, gluconate, citrate, benzoate. For example, the cure accelerator can be a copper (II) or aluminum (III) salts of 0-diketonates; copper (II), iron (II), iron (III), cobalt (II), cobalt (III), or aluminum (III) salts of acetylacetonates; zinc (II), chromium (II), or manganese (II) salts of octoates; or a combination thereof.

When the curable thermosetting composition includes a curing catalyst, the curing catalyst can be included in an amount of 0.01 to 5 wt %, or 0.05 to 5 wt %, or 0.1 to 5 wt %, based on total weight of the curable thermosetting composition.

The curable thermosetting composition can optionally include a curing initiator, such as a peroxide compound. Exemplary peroxide curing initiators can include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, t-butylperoxybenzoate, t-butylperoxy 2-ethylhexyl carbonate, 2,4-dichlorobenzoyl peroxide, 2,5-dimethylhexane-2,5-dihydroperoxide, butyl-4,4-bis(tert-butyldioxy)valerate, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, dicumylperoxide, t-butylperoxybenzoate, 2,2-bis(t-butylperoxy)butane, 2,2-bis(t-butylperoxy)octane, 2,5-dimethyl-2,5-di(benzoylperoxy)hexane, 1,1-di-(tert-butylperoxy)-3,3,5-trimethylcyclohexane, di(trimethylsilyl) peroxide, trimethylsilylphenyltriphenylsilyl peroxide, or a combination thereof.

When the curable thermosetting composition includes a curing initiator, the curing initiator can be included in an amount of 0.1 to 5 wt %, or 0.5 to 5 wt %, or 1 to 5 wt %, based on total weight of the curable thermosetting composition.

Flame retardants include, for example, organic compounds that comprise phosphorus, bromine, or chlorine. Non-brominated and non-chlorinated phosphorus-containing flame retardants can be preferred in certain applications for regulatory reasons, for example organic phosphates and organic compounds containing phosphorus-nitrogen bonds.

Examples of phosphorous flame retardants include phosphates, phosphazenes, phosphite esters, phosphines, phosphinates, polyphosphates, and phosphonium salts. Phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, xylenyl-diphenyl phosphate; cresyl-diphenyl phosphate; 1,3-phenylenebis(di-2,6-xylenyl phosphate); 9,10-dihydro-9-oxa-10-phospha-phenanthrene-10-oxide (DOPO), tetraphenyl diphosphate (RDP), condensed phosphate compounds such as aromatic condensed phosphate compounds; and cyclic phosphate compounds, bis(diphenyl) phosphate of hydroquinone, bis (diphenyl) phosphate of bisphenol A, or their oligomeric or polymeric counterparts, or a combination thereof.

Examples of the phosphazene compounds include cyclic and chain phosphazene compounds. The cyclic phosphazene compounds (cyclophosphazenes) have a cyclic structure in which phosphorus-nitrogen double bonds are present in the molecule. Examples of phosphinate compounds include aluminum dialkylphosphinate, aluminum tris-(diethylphosphinate), aluminum tris-(methylethylphosphinate), aluminum tris-(diphenylphosphinate), zinc bis-(diethylphosphinate), zinc bis-(methylphosphinate), zinc bis-(diphenylphosphinate), titanyl bis-(diethylphosphinate), titanyl bis-(methylethylphosphinate), and titanyl bis-(diphenylphosphinate). Examples of polyphosphate compounds include melamine polyphosphate, melam polyphosphate, and melem polyphosphate. Examples of phosphonium salt compounds include tetraphenylphosphonium tetraphenylborate. Examples of the phosphite ester compounds include trimethylphosphite and triethylphosphite. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide.

Halogenated materials can also be used as flame retardants, for example bisphenols such as 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloro-naphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromobiphenyl ether, decabromodiphenylethane, as well as oligomeric and polymeric halogenated aromatic compounds, such as brominated styrene, 4,4-dibromobiphenyl, ethylene-bis(tetrabromophthalimide), or a copolycarbonate of bisphenol A and tetrabromobisphenol A and a carbonate precursor, e.g., phosgene. Metal synergists, e.g., antimony oxide, can be present.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO3$, or fluoro-anion complexes such as $Li_3AlF_6$, $BaSiF_6$, $KBF_4$, $K_3AlF_6$, $KAlF_4$, $K_2SiF_6$, or $Na_3AlF_6$.

When the curable thermosetting composition includes a flame retardant, the flame retardant can be included in an amount of greater than 1 wt %, or 1 to 20 wt %, or 5 to 20 wt %, based on total weight of the curable thermosetting composition.

The curable thermosetting composition can further include inorganic or organic fillers, such as a particulate filler, a fibrous filler, or a combination thereof. Any inorganic and organic fillers, including those known in the art, can be used without limitation.

Exemplary fillers include, for example, clay, talc, kaolin, wollastonite, mica, calcium carbonate, magnesium carbonate; alumina, thiourea, glass powder, B- or Sn-based fillers such as zinc borate, zinc stannate and zinc hydroxystannate; metal oxides such as zinc oxide and tin oxide. alumina, silica (including fused silica, fumed silica, spherical silica, and crystalline silica), boron nitride (including spherical boron nitride), aluminum nitride, silicon nitride, magnesia, magnesium silicate, antimony trioxide, glass fibers (chopped, milled, or cloth), glass mat, glass bubbles, hollow glass microspheres, aramid fibers, quartz, or a combination thereof. Other exemplary inorganic fillers include powdered titanium ceramics such as any one of the titanates of barium. lead, strontium, calcium, bismuth, magnesium, or the like. Inorganic fillers also include hydrates such as aluminum hydroxide, magnesium hydroxide, zeolite, and hydrotalcite. In some aspects, the filler can be coated or surface treated with a coupling agent as disclosed herein.

Glass fibers include those based on E, A, C, ECR, R, S, D, and NE glasses, as well as quartz. The glass fiber can have any suitable diameter, such as from 2 to 30 micrometers (m), or 5 to 25 µm, or 5 to 15 m. The length of the glass fibers before compounding are not limited and can be 2 to 7 millimeters (mm), or 1.5 to 5 mm. Alternatively, longer glass fibers or continuous glass fibers can be used. Suitable glass fiber is commercially available from suppliers such as Owens Corning, Nippon Electric Glass, PPG, and Johns Manville.

The organic filler can be, for example, polytetrafluoroethylene powder, polyphenylene sulfide powder, and poly (ether sulfones) powder, poly(phenylene ether) powder, polystyrene, divinylbenzene resin, or a combination thereof.

The filler can be selected based on the thermal expansion coefficient (CTE) and thermal conductivity requirements. For example, $Al_2O_3$, BN, AlN, or a combination thereof, can be used for an electronics module with high thermal conductivity. For example, MgO can be used for increased thermal conductivity and increased CTE. For example, $SiO_2$ (e.g., amorphous $SiO_2$) can be used for a lightweight module having a low CTE and a small dielectric constant.

When the curable thermosetting composition includes a filler, the filler can be included in an amount of greater than 1 wt %, or 1 to 50 wt %, or 1 to 30 wt %, or 10 to 30 wt %, based on total weight of the curable thermosetting composition.

Coupling agents, also referred to as adhesion promoters, include chromium complexes, silanes, titanates, zircon-aluminates, olefin-maleic anhydride copolymers, reactive cellulose esters, or the like. Exemplary olefin-maleic anhydride copolymers can include maleic anhydride grafted polyethylene, maleic anhydride grafted polypropylene, or a combination thereof. Exemplary silanes can include epoxysilane compound, aminosilane compounds methacryloxysilane compounds, vinylsilane compounds, or a combination thereof.

Illustrative examples of aminosilane coupling agents include γ-aminopropyltrimethoxysilane, γ-aminopropyltriethoxysilane, N-beta(aminoethyl)γ-aminopropylmethyl-dimethoxysilane, N-beta(aminoethyl)γ-aminopropyltrimethoxysilane, N-beta(aminoethyl)γ-aminopropyltriethoxysilane and combinations of two or more of the foregoing. Illustrative epoxysilane coupling agents include γ-glycidoxypropylmethyldiethoxysilane, γ-glycidoxy-propyltrimethoxysilane, γ-glycidoxypropyltriethoxysilane and combinations of two or more of the foregoing. Illustrative methacryloxysilane coupling agents include γ-methacryloxypropyl-methyldimethoxysilane, γ-methacryloxypropyltrimethoxysilane, γ-methacryloxypropyl-diethoxysilane, γ-methacryloxypropyltriethoxysilane, or a combination thereof.

Other exemplary silane coupling agents include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilyl-ethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilyl-propylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilyl-propylbenzothiazolyl tetrasulfide, or a combination thereof. The silane coupling agent can be a polysulfide silane coupling agent having 2 to 4 sulfur atoms forming a polysulfide bridge. For example, the coupling agent can be a bis(3-triethoxysilylpropyl) di-, tri-, or tetrasulfide.

When the curable thermosetting composition includes a coupling agent, the coupling agent can be included in an amount of 0.01 to 5 wt %, or 0.05 to 5 wt %, or 0.1 to 5 wt %, based on total weight of the curable thermosetting composition.

The curable thermosetting composition can optionally include a solvent. The solvent can be, for example, a $C_{3-8}$ ketone, a $C_{3-8}$ N,N-dialkylamide, a $C_{4-16}$ dialkyl ether, a $C_{6-12}$ aromatic hydrocarbon, a $C_{1-3}$ chlorinated hydrocarbon, a $C_{3-6}$ alkyl alkanoate, a $C_{2-6}$ alkyl cyanide, or a combination thereof. Specific ketone solvents include, for example, acetone, methyl ethyl ketone, methyl isobutyl ketone, or a combination thereof. Specific $C_{4-8}$ N,N-dialkylamide solvents include, for example, dimethylformamide, dimethylacetamide, N-methyl-2-pyrrolidone, or a combination thereof. Specific dialkyl ether solvents include, for example, tetrahydrofuran, ethylene glycol monomethylether, dioxane, or a combination thereof. Specific aromatic hydrocarbon solvents include, for example, benzene, toluene, xylenes, styrene, divinylbenzenes, or a combination thereof. The aromatic hydrocarbon solvent can be non-halogenated. Specific $C_{3-6}$ alkyl alkanoates include, for example, methyl acetate, ethyl acetate, methyl propionate, ethyl propionate, or a combination thereof. Specific $C_{2-6}$ alkyl cyanides include, for example, acetonitrile, propionitrile, butyronitrile, or a combination thereof. Specific $C_{2-6}$ alkyl cyanides include, for example, acetonitrile, propionitrile, butyronitrile, or a combination thereof. For example, the solvent can be N,N-dimethylformamide, N,N-dimethyl acetamide, N,N- diethyl acetamide, N,N-dimethylmethoxyacetamide, N-methyl-2-pyrrolidone, N-cyclohexylpyrrolidinone, N-methylcaprolactam, 1,3-dimethyl-2-imidazolidone, 1,2-dimethoxyethane, 1,3-dioxane, 1,4-dioxane, tetrahydrofuran, y-butyrolactone, y-caprolactone, dimethylsulfoxide, benzophenone, methyl ethyl ketone, methyl isobutyl ketone, cyclohexanone, diglyme, triglyme, tetraglyme, N,N-dimethylethyleneurea, N,N-dimethylpropyleneurea, tetramethylurea, propylene glycol phenyl ether, anisole, veratrole, o-dichlorobenzene, chloro-benzene, trichloroethane, methylene chloride, chloroform, pyridine, picoline, ethyl lactate, n-butyl acetate, butyl cellosolve acetate, butyl carbitol acetate, ethyl cellosolve acetate, ethyl carbitol acetate, propylene carbonate, sulfolane, an ionic liquid, or a combination thereof.

When a solvent is utilized, the curable thermosetting composition can include 2 to 99 wt % of the solvent, based on weight total of the curable thermosetting composition. For example, the solvent amount can be 5 to 80 wt %, or 10 to 60 wt %, or 20 to 50 wt %, based on weight total of the curable thermosetting composition. The solvent can be chosen, in part, to adjust the viscosity of the curable thermosetting composition. Thus, the solvent amount can depend on variables including the type and amount of capped poly(arylene ether) copolymer, the type and amount of other components such as curing additive, the type and amount of auxiliary thermosetting resin(s), and the processing temperature used for any subsequent processing of the curable thermosetting composition, for example, impregnation of a reinforcing structure with the curable thermosetting composition for the preparation of a composite. The solvent can be anhydrous. For example, the solvent can include less than 100 parts per million (ppm), or less than 50 ppm, or less than 10 ppm of water, based on total weight of the solvent.

The curable thermosetting composition can further include a curable unsaturated monomer composition, which can include, for example, a monofunctional styrenic compound (e.g., styrene), a monofunctional (meth)acrylic compound, or a combination thereof. For example, the curable unsaturated monomer composition can be an alkene-containing monomer or an alkyne-containing monomer. Exemplary alkene- and alkyne-containing monomers include those described in U.S. Pat. No. 6,627,704, and include (meth)acrylates, (meth)acrylamides, N-vinylpyrrolidone, and vinylazalactones as disclosed in U.S. Pat. No. 4,304,705. Exemplary monofunctional monomers include mono (meth)acrylates, such as methyl (meth)acrylate, ethyl (meth) acrylate, isopropyl (meth)acrylate, isooctyl (meth)acrylate, isobornyl (meth)acrylate, (meth)acrylic acid, n-hexyl (meth) acrylate, tetrahydrofurfuryl (meth)acrylate, N-vinylcaprolactam, N-vinylpyrrolidone, (meth)acrylonitrile, or the like, or a combination thereof.

The curable thermosetting composition may optionally further include one or more additional additives. Additional additives include, for example, dyes, pigments, colorants, antioxidants, heat stabilizers, light stabilizers, plasticizers, defoaming agents, lubricants, dispersants, flow modifiers, drip retardants, antiblocking agents, antistatic agents, flow-promoting agents, processing aids, substrate adhesion agents, mold release agents, toughening agents, low-profile additives, stress-relief additives, or a combination thereof. When present, the additional additives can be included in any effective amount, for example in an amount of 0.01 to 20 wt %, or 0.01 to 10 wt %, or 0.01 to 5 wt %, or 0.01 to 1 wt %, based on the total weight of the curable thermosetting composition.

The curable thermosetting composition can be prepared by combining the capped poly(arylene ether) copolymer and the other optional components disclosed herein using any suitable method.

Also provided is a cured thermoset composition comprising a cured product of the curable thermosetting composition. There is no particular limitation on the method by which the curable thermosetting composition can be cured. The curable composition can, for example, be cured thermally or by using irradiation techniques, including UV irradiation or electron beam irradiation. For example, a cured product can be obtained by heating the curable thermosetting composition defined herein for a time and temperature sufficient to evaporate the solvent and effect curing. When heat curing is used, the temperature can be 30 to 400° C., or 50 to 250° C., or 100 to 250° C. The heating can be for 1 minute to 24 hours, or 1 minute to 6 hours, or 3 hours to 5 hours. The curing can be staged to produce a partially cured and often tack-free resin, which then is fully cured by heating for longer periods or temperatures within the aforementioned ranges. As used herein, the term "cured" encompasses products that are partially cured or fully cured.

The cured thermoset composition can achieve one or more desirable properties such as improved viscosity, coefficient of thermal expansion (CTE), dissipation factor, equilibrium water absorption, or a combination thereof.

The disclosed curable thermosetting compositions and cured compositions can be used in a variety of applications and uses, including any applications where conventional thermosetting compositions are used. For example, useful articles including the curable thermosetting composition or the cured thermoset composition can be in the form of a composite, a foam, a fiber, a layer, a coating, an encapsulant, an adhesive, a sealant, a molded component, a prepreg, a casing, a laminate, a metal clad laminate, an electronic composite, a structural composite, or a combination thereof. Exemplary uses and applications include coatings such as protective coatings, sealants, weather resistant coatings, scratch resistant coatings, and electrical insulative coatings; adhesives; binders; glues; composite materials such as those using carbon fiber and fiberglass reinforcements. When utilized as a coating, the disclosed compounds and compositions can be deposited on a surface of a variety of underlying substrates. For example, the compositions can be deposited on a surface of metals, plastics, glass, fiber sizings, ceramics, stone, wood, or any combination thereof. The disclosed compositions can be used as a coating on a surface of a metal container (e.g., aluminum or steel), such as those commonly used for packaging and containment in the paint and surface covering industries. The curable thermosetting composition and the cured thermoset composition derived therefrom can also be particularly well suited for use in forming electrical components and computer components.

Methods of forming a composite can include impregnating a reinforcing structure with a curable thermosetting composition; partially curing the curable thermosetting composition to form a prepreg; and laminating a plurality of prepregs. The reinforcing structure can be a porous base material such as a fibrous preform or substrate, or other porous material comprising a ceramic, a polymer, a glass, carbon, or a combination thereof. For example, the porous base material can be woven or non-woven glass fabric, a fiberglass fabric, or carbon fiber. When the article includes a fibrous preform, the method of manufacturing the article can include forming the article from the curable thermosetting composition by coating or impregnating the preform with the varnish. The impregnated fibrous preform can optionally be shaped before or after removing the solvent. In some aspects, the curable thermosetting composition layer can further comprise a woven or nonwoven glass fabric. For example, the curable layer can be prepared by impregnating the glass fabric with a curable composition and removing the solvent from the impregnated glass fabric. Exemplary reinforcing structures are described, for example, in Anonymous (Hexcel Corporation), "Prepreg Technology", March 2005, Publication No. FGU 017b; Anonymous (Hexcel Corporation), "Advanced Fibre Reinforced Matrix Products for Direct Processes", June 2005, Publication No. ITA 272; and Bob Griffiths, "Farnborough Airshow Report 2006", CompositesWorld.com, September 2006. The weight and thickness of the reinforcing structure are chosen according to the intended use of the composite using criteria well known to those skilled in the production of fiber reinforced resin composites. The reinforced structure can contain various finishes suitable for the thermosetting components of the curable thermosetting composition.

The method of manufacturing the articles from the curable thermosetting composition can include partially curing the curable thermosetting composition to form a prepreg, or fully curing the curable thermosetting composition to form a composite article. References herein to properties of the "cured composition" refer to a composition that is substantially fully cured. For example, the resin in a laminate formed from prepregs is typically substantially fully cured. One skilled in the thermoset arts can determine whether a sample is partially cured or substantially fully cured without undue experimentation. The curing can be before or after removing the solvent from the curable composition. In addition, the article can be further shaped before removal of the solvent or after removal of the solvent, before curing, after partial curing, or after full curing, for example by thermoforming. In an aspect, the article is formed, and the solvent is removed; the article is partially cured (B-staged); optionally shaped; and then further cured.

Commercial-scale methods of forming composites are known in the art, and the curable thermosetting compositions described herein are readily adaptable to existing processes and equipment. For example, prepregs are often produced on treaters. The main components of a treater include feeder rollers, a resin impregnation tank, a treater oven, and receiver rollers. The reinforcing structure (E-glass, for example) is usually rolled into a large spool. The spool is then put on the feeder rollers that turn and slowly roll out the reinforcing structure. The reinforcing structure then moves through the resin impregnation tank, which contains the curable thermosetting composition. The curable composition impregnates the reinforcing structure. After emerging from the tank, the coated reinforcing structure moves upward through the vertical treater oven, which is typically at a temperature of 175 to 200° C., and the solvent is evaporated. The resin begins to polymerize at this time. When the composite comes out of the tower it is sufficiently cured so that the web is not wet or tacky. The cure process, however, is stopped short of completion so that additional curing can occur when laminate is made. The web then rolls the prepreg onto a receiver roll.

Electrical and electronic articles including or derived from the curable thermosetting composition are also provided. Articles include those comprising printed circuits as used in medical or aerospace industries. Still other articles include antennae and like articles. Articles such as printed circuit boards are used, for example, in lighting, solar energy, displays, cameras, audio and video equipment, personal computers, mobile telephones, electronic notepads, and similar devices, or office automation equipment. For example, electrical parts can be mounted on printed circuit boards comprising a laminate. Other exemplary articles prepared from the varnish composition for various applications can include copper clad laminates (CCL), for example, metal core copper clad laminates (MCCCL), composite articles, and coated articles, for example multilayer articles.

Dielectric layer can be prepared from the curable thermosetting composition can be useful in a circuit assembly, for example, in a metal-clad laminate such as a copper clad laminate. For example, a laminate can comprise a dielectric layer, a conductive metal circuit layer disposed on the dielectric layer, and optionally, a heat dissipating metal matrix layer disposed on the dielectric layer on a side opposite the conductive metal layer. The dielectric layer can optionally include a fibrous preform (e.g., a fabric layer). For example, the dielectric layer can further include a glass fabric layer.

The conductive metal layer can be in the form of a circuit, and can be copper, zinc, tin, brass, chromium, molybdenum, nickel, cobalt, aluminum, stainless steel, iron, gold, silver, platinum, titanium, or a combination thereof. Other metals include a copper molybdenum alloy, a nickel-cobalt iron alloy such as KOVAR, available from Carpenter Technology Corporation, a nickel-iron alloy such as INVAR, available from National Electronic Alloys, Inc., a bimetal, a trimetal, a trimetal derived from two-layers of copper and one layer of INVAR, and a trimetal derived from two layers of copper and one layer of molybdenum. Exemplary metal layers comprise copper or a copper alloy. Alternatively, wrought copper foils can be used. Conductive metal layers can have a thickness of 2 to 200 micrometers (m), or 5 to 50 am, or 5 to 40 m.

A heat dissipating metal matrix layer can be a thermally conductive metal such as aluminum, boron nitride, aluminum nitride, copper, iron, steel, or a combination thereof. A thermally conductive, electrically conductive metal can be used provided that the metal is electrically isolated from the metal circuit layer. Preferred supporting metal matrix layers can have a thickness of 0.1 to 20 millimeters (mm), or 0.5 to 10 mm, or 0.8 to 2 mm.

The conductive metal layer and the supporting metal matrix layers can be pretreated to have high surface roughness for enhanced adhesion to the dielectric layer. Treatment methods include washing, flame treatment, plasma discharge, corona discharge, or the like, for example to enhance adhesion of the metal layer. The dielectric layer can adhere firmly to the conductive metal layer or the heat dissipation layer without using an adhesive, or an adhesive can be used to improve adhesion of the dielectric layer to the conductive metal layer or the heat dissipation layer. Exemplary adhesives used to bond the composite sheet to a metal include polyimide adhesives, acrylic adhesives, epoxies, or a combination thereof.

The copper clad laminates can be made by thermal lamination of one or more dielectric layers, one or more conductive metal layers, and a supporting metal matrix layer, under pressure without using thermosetting adhesives. The dielectric layer can be prepared from the curable thermosetting composition and can be prepared prior to the thermal lamination step by a solvent casting process to form a layer. For example, the dielectric layer, the conductive metal layer, and the thermal dissipation layer can be thermally laminated together by an adhesive-free process under pressure to form a laminate. The electrically conductive metal layer can optionally be in the form of a circuit before laminating, or the conductive metal layer can optionally be etched to form the electrical circuit following lamination. The laminating can be by hot press or roll calendaring methods, for example, a roll-to-roll method. The conductive metal layer in a copper clad laminate can further be patterned to provide a printed circuit board. Furthermore, the copper clad laminates can be shaped to provide a circuit board having the shape of a sheet, a tube, or a rod.

Alternatively, laminates for a circuit assembly can be made by a solution casting method in which the curable thermosetting composition is cast directly onto the electrically conductive metal layer, followed by lamination to the heat dissipating metal matrix layer. For example, the curable thermosetting composition can be cast directly onto the heat dissipating metal matrix layer, followed by lamination to the electrically conductive metal layer.

Multilayer laminates including additional layers can also be made by thermal lamination in one step or in two or more consecutive steps by such processes as hot press or roll calendaring methods. For example, seven layers or fewer can be present in the laminate, or sixteen layers or fewer. In an aspect, a laminate can be formed in one step or in two or more consecutive steps with sequential layers of fabric-thermoset-metal-thermoset-fabric-thermoset-metal foil or a sub-combination thereof with fewer layers, such that the laminate comprises a layer of thermoset film between any layer of metal foil and any layer of fabric. In another aspect, a first laminate can be formed in one step or in two or more consecutive steps with a layer of fabric between two layers of the thermoset, such as a layer of woven glass fabric between two layers of the thermoset. A second laminate can then be prepared by laminating a metal foil to a thermoset side of the first laminate.

Printed circuit boards prepared from the curable thermosetting composition can have an overall thickness of 0.1 to 20 mm, and specifically 0.5 to 10 mm, wherein overall thickness refers to an assembly comprising a layer each of the dielectric layer, the electrically conductive metal layer, and the supporting metal matrix layer. Circuit assemblies can have an overall thickness of 0.5 to 2 mm, and specifically 0.5 to 1.5. There is no particular limitation on the thickness of the dielectric layer and can be 5 to 1500 m, or 5 to 750 m, or 10 to 150 m, or 10 to 100 m. For example, the printed circuit board can be a metal core printed circuit board (MCPCB) for use in a light emitting diode (LED) application.

The curable thermosetting composition can be used as a coating, for example in the preparation of a multilayer article. A method of manufacturing the coating can include combining the curable thermosetting composition and optionally a fluoropolymer and forming a coating on a substrate. For example, a multilayer article can be manufactured by forming a layer including the curable thermosetting composition, removing the solvent from the layer and optionally curing to provide a primer layer, forming a second layer comprising a ceramic (e.g., $Al_2O_3$, $TiO_2$, $ZrO_2$, $Cr_2O_3$, $SiO_2$, MgO, BeO, $Y_2O_3$, $Al_2O_3$—$SiO_2$, MgO—$ZrO_2$, SiC, WC, $B_4C$, TiC, $Si_3N_4$, TiN, BN, AlN, TiB, $ZrB_2$, or the like), a thermoplastic polymer, a fluoropolymer (e.g., polytetrafluoroethylene, tetrafluoroethylene-perfluoroalkylvinylether copolymers, tetrafluoroethylene-hexafluoropropylene copolymers, polychlorotrifluoroethylene, tetrafluoroethylene-ethylene copolymers, polyvinylidene fluoride, or the like), or a combination thereof on the primer layer to provide the multilayer article, and optionally thermally treating the multilayer article to cure the curable thermosetting composition. In some aspects, the second layer can further include the curable thermosetting composition.

Additional applications for the curable thermosetting compositions include, for example, acid bath containers; neutralization tanks; aircraft components; bridge beams; bridge deckings; electrolytic cells; exhaust stacks; scrubbers; sporting equipment; stair cases; walkways; automobile exterior panels such as hoods and trunk lids; floor pans; air scoops; pipes and ducts, including heater ducts; industrial fans, fan housings, and blowers; industrial mixers; boat hulls and decks; marine terminal fenders; tiles and coatings; building panels; business machine housings; trays, including cable trays; concrete modifiers; dishwasher and refrigerator parts; electrical encapsulants; electrical panels; tanks, including electrorefining tanks, water softener tanks, fuel tanks, and various filament-wound tanks and tank linings; furniture; garage doors; gratings; protective body gear; luggage; outdoor motor vehicles; pressure tanks; optical waveguides; radomes; railings; railroad parts such as tank cars; hopper car covers; car doors; truck bed liners; satellite dishes; signs; solar energy panels; telephone switchgear housings; tractor parts; transformer covers; truck parts such as fenders, hoods, bodies, cabs, and beds; insulation for rotating machines including ground insulation, turn insulation, and phase separation insulation; commutators; core insulation and cords and lacing tape; drive shaft couplings; propeller blades; missile components; rocket motor cases; wing sections; sucker rods; fuselage sections; wing skins and flarings; engine narcelles; cargo doors; tennis racquets; golf club shafts; fishing rods; skis and ski poles; bicycle parts; transverse leaf springs; pumps, such as automotive smog pumps; electrical components, embedding, and tooling, such as electrical cable joints; wire windings and densely packed multi-element assemblies; sealing of electromechanical devices; battery cases; resistors; fuses and thermal cut-off devices; coatings for printed wiring boards; casting items such as capacitors, transformers, crankcase heaters; small molded electronic parts including coils, capacitors, resistors, and semiconductors; as a replacement for steel in chemical processing, pulp and paper, power generation, and wastewater treatment; scrubbing towers; pultruded parts for structural applications, including structural members, gratings, and safety rails; swimming pools, swimming pool slides, hot-tubs, and saunas; drive shafts for under the hood applications; dry toner resins for copying machines; marine tooling and composites; heat shields; submarine hulls; prototype generation; development of experimental models; laminated trim; drilling fixtures; bonding jigs; inspection fixtures; industrial metal forming dies; aircraft stretch block and hammer forms; vacuum molding tools; flooring, including flooring for production and assembly areas, clean rooms, machine shops, control rooms, laboratories, parking garages, freezers, coolers, and outdoor loading docks; electrically conductive compositions for antistatic applications; for decorative flooring; expansion joints for bridges; injectable mortars for patch and repair of cracks in structural concrete; grouting for tile; machinery rails; metal dowels; bolts and posts; repair of oil and fuel storage tanks, and numerous other applications.

Processes useful for preparing the articles and materials include those generally known to the art for the processing of thermosetting resins. Such processes have been described in the literature as in, for example, Engineered Materials Handbook, Volume 1, Composites, ASM International Metals Park, Ohio, copyright 1987 Cyril A. Dostal Senior Ed, pp. 105-168 and 497-533, and "Polyesters and Their Applications" by Bjorksten Research Laboratories, Johan Bjorksten (pres.) Henry Tovey (Ch. Lit. Ass.), Betty Harker (Ad. Ass.), James Henning (Ad. Ass.), Reinhold Publishing Corporation, New York, 1956. Processing techniques include resin transfer molding; sheet molding; bulk molding; pultrusion; injection molding, including reaction injection molding (RIM); atmospheric pressure molding (APM); casting, including centrifugal and static casting open mold casting; lamination including wet or dry lay up and spray lay up; also included are contact molding, including cylindrical contact molding; compression molding; including vacuum assisted resin transfer molding and chemically assisted resin transfer molding; matched tool molding; autoclave curing; thermal curing in air; vacuum bagging; pultrusion; Seeman's Composite Resin Infusion Manufacturing Processing (SCRIMP); open molding, continuous combination of resin and glass; and filament winding, including cylindrical filament winding. For example, an article can be prepared by a resin transfer molding process.

Also provided is a varnish composition including the curable thermosetting composition disclosed herein and a solvent. The solvent of the varnish composition can be the same as those disclosed herein for the curable thermosetting composition.

The varnish composition can be prepared by combining the capped poly(arylene ether) copolymer, the solvent, and any optional components by stirring until a viscous solution is formed. For example, a method of manufacturing the varnish composition can include combining the components of the varnish composition, and heating the components with agitation, stirring, or both at a temperature and for a period of time effective to dissolve the components in the solvent, or at a temperature lower than the boiling point of the solvent. The temperature is not particularly limited, and can be 50° C. or less, or 30° C. or less, or 25° C. or less.

The varnish composition can be used in the manufacture of articles useful for a wide variety of applications, including those disclosed herein. An article can be manufactured from the varnish composition by, for example, forming the article from the varnish composition, for example by casting, molding, extruding, and removing the solvent from the formed article. Exemplary articles can be in the form of a composite, a foam, a fiber, a layer, a coating, an encapsulant, an adhesive, a sealant, a cast article, a molded component, a prepreg, a casing, a laminate, a metal clad laminate, an electronic composite, a structural composite, or a combination thereof. In some aspects, the article can be a layer, and can be formed by casting the varnish composition onto a substrate to form a cast layer. The solvent can be removed by any number of means, including by heating the cast layer, heating the cast layer under heat and pressure, for example by laminating the cast layer to another substrate. In some aspects, articles prepared by the above-described methods can include adhesives, packaging material, capacitor films, or circuit board layers. In some aspects, articles prepared from the varnish composition can be a dielectric layer, or a coating disposed on a substrate, for example a wire or cable coating. For example, the article can be a dielectric layer in a circuit material, for example in a printed circuit board, used, for example, in lighting or communications applications. Other exemplary articles prepared from the varnish composition can be one or more painted layers. The varnish compositions can be used to prepare articles as disclosed herein for other curable thermosetting compositions.

This disclosure is further illustrated by the following examples, which are non-limiting.

EXAMPLES

Components used in the examples are summarized in Table 1.

TABLE 1

| Component | Description |
|---|---|
| PPE | Poly(phenylene ether) copolymer prepared from a monohydric phenol and tetramethylbisphenol A, methacrylate end-capped, $M_n$ of 2,300 g/mol using polystyrene standards (GPC); obtained from SABIC. |
| PPE-MPP | Poly(phenylene ether) copolymer prepared from 2-methyl-6-phenyl phenol and tetramethylbisphenol A, methacrylate end-capped, $M_n$ of 2800 g/mol using polystyrene standards (GPC); obtained from SABIC. |
| TAIC | Triallyl isocyanurate, obtained from Acros Organics. |
| Promoter | α,α'-bis(t-butylperoxy-m-isopropyl)benzene, obtained as PERKODAX 14 (Akzo Nobel) |
| Flame Retardant | 1,2-Bis(2,3,4,5,6-pentabromophenyl)ethane; obtained as SAYTEX 8010 from Albemarle. |
| Filler | Spherical silica, 300 nm particle size; obtained as SFP-20M from Denka. |
| Coupling Agent | 3-Trimethoxysilyl-propyl-methacrylate, obtained from Fisher Scientific. |

Weight average molecular weight ($M_w$) was measured by gel permeation chromatography (GPC). Solution viscosity was measured using Brookfield Viscometer at 25° C. with Spindle S00. Gel time was measured under nitrogen using 25 millimeter (mm) parallel plates with a target gap of 1 mm between plates. An oscillation temperature ramping profile was used from a starting temperature of 80° C. and ramp rate of 5° C./min with constant strain of 30%, and angular frequency of 10 radians per second (Rad/s) (ARES G2 Rheometer, TA Instruments). Viscosity was measured under nitrogen using 25 mm parallel plates with a target gap of 1 mm between plates. An oscillation temperature ramping profile was used from a starting temperature of 80° C. and ramp rate of 3° C./min with constant strain of 1%, and angular frequency of 10 Rad/s (ARES G2 Rheometer, TA Instruments). Glass transition temperature ($T_g$) was measured by differential scanning calorimetry (DSC) from 25 to 300° C. at a rate of 20° C./min (DSC, TA Instruments). Heat of exotherm and extent of cure were measured from 25 to 300° C. at a rate of 10° C./min (DSC, TA Instruments). The onset thermal decomposition temperature was measured by thermal gravimetric analysis (TGA) from 25 to 800° C. at a rate of 10° C./min (TGA, TA Instruments). Coefficient of thermal expansion (CTE) was measured by thermal mechanical analysis (TMA) from 25 to 300° C. at a rate of 10° C./min (TMA, TA Instruments). Dielectric constant and dissipation factor were measured using a network analyzer equipped with split post resonator (SPDR) after the castings were conditioned at 50% relative humidity for 24 hours (Agilent Technologies E5071C). Moisture absorption was measured by placing samples in a water bath at 85° C. The samples were taken out from the bath, damp dried, and weighed after 24 hours.

Curable compositions were prepared by combining the components shown in Table 2, wherein the amounts are in weight percent based on the total weight of the curable thermosetting composition.

TABLE 2

| Component | Comparative Example | Example |
|---|---|---|
| PPE | 49 | — |
| PPE-MPP | — | 49 |
| TAIC | 21 | 21 |

TABLE 2-continued

| Component | Comparative Example | Example |
|---|---|---|
| Promoter | 2 | 2 |
| Flame Retardant | 8 | 8 |
| Filler | 20 | 20 |
| Silane Coupling Agent | 0.3 | 0.3 |

The curable thermosetting compositions were dissolved and dispersed in chloroform, disposed on a plate, and the chloroform was removed under vacuum and nitrogen to obtain a dried powder. The dried powder was used for chemorheology after partially curing the compositions by heating until a gel was obtained.

The properties of the partially cured compositions (gels) are shown in Table 3.

TABLE 3

| Property | Units | Comparative Example | Example |
|---|---|---|---|
| $M_n$ | g/mol | 2300 | 2800 |
| Viscosity in toluene, 50 wt % | cP | 298 | 107 |
| Viscosity in MEK, 50 wt % | cP | 160 | 36 |
| Heat of Exotherm | J/g | 204 | 211 |
| Onset Exotherm Temperature (DSC) | °C. | 127 | 129 |
| Peak Exotherm Temperature (DSC) | °C. | 160 | 157 |
| Gel Time | seconds | 446 | 468 |
| Resin Flow (before B-stage) | Pa·s | 253 | 151 |
| Resin Flow (after B-stage) | Pa·s | 15664 | 8327 |
| Extent of Cure (after B-stage, DSC) | % | 10 | 13.4 |

The partially cured compositions were transferred to a 40 mm diameter die and heated to 150° C. under 1 ton of pressure. The sample was then cooled to 70° C. and the die was transferred into an oven, where the sample was cured at 200° C. for 120 minutes under vacuum.

The properties of the cured compositions are shown in Table 4.

TABLE 4

| Property | Units | Comparative Example | Example |
|---|---|---|---|
| Glass Transition Temperature (DSC) | °C. | 228 | 180 |
| Onset Decomposition Temperature (TGA) | °C. | 400 | 405 |
| Glass Transition Temperature (TMA) | °C. | 251 | 231 |
| Coefficient of Thermal Expansion (>$T_g$) (TMA)* | ppm °C. | 253 | 205 |
| Dielectric Constant (10 GHz) | — | 2.83 ± 0.03 | 2.85 ± 0.01 |
| Dissipation Factor (10 GHz) | ×10$^{-3}$ | 5.75 ± 0.083 | 3.85 ± 0.06 |
| Equilibrium Water Absorption (85° C.) | wt % | 0.79 | 0.44 |

*The coefficient of thermal expansion was determined at a temperature above the $T_g$.

As shown in Tables 3 and 4, the dielectric performance, resin flow after partial curing, coefficient of thermal expansion, and water absorption of the Example are improved relative to the Comparative Example. In addition, the onset decomposition temperature and dielectric constant were similar for the Example and Comparative Example. These results are surprising, as it was unexpected that the incorporation of a repeating unit derived from a 2-($C_{1-12}$ primary or secondary alkyl)-6-(unsubstituted $C_{6-12}$ aryl)phenol, such as 2-methyl-6-phenyl phenol, in a poly(arylene ether) copolymer can concurrently improve the properties noted in Tables 3 and 4.

The FIGURE is a spider chart showing that the Example has a smaller total area than the total area of the Comparative Example based on several properties. The results demonstrate that the Example can concurrently achieve an improved combination of dissipation factor, viscosity, $T_g$, CTE, and water absorption. The curable thermosetting compositions therefore can provide performance attributes desirable for resins used in electronic materials, particularly prepregs, laminates, and metal clad laminates for printed circuit boards.

This disclosure further encompasses the following aspects.

Aspect 1. A curable thermosetting composition comprising a capped poly(arylene ether) copolymer comprising a reactive end group, wherein the capped poly(arylene ether) copolymer is derived from an alkyl, aryl-phenol.

Aspect 2. The curable thermosetting composition of aspect 1, wherein the capped poly(arylene ether) copolymer is derived from a reaction of a dihydric phenol and a monohydric phenol comprising a 2-(alkyl)-6-(aryl)phenol; or wherein the monohydric phenol is a 2-($C_{1-12}$ primary or secondary alkyl)-6-(unsubstituted $C_{6-12}$ aryl)phenol.

Aspect 3. The curable thermosetting composition of any one of the preceding aspects, wherein the capped poly(arylene ether) copolymer is of formula (1) or formula (2) as provided herein.

Aspect 4. The curable thermosetting composition of aspect 3, wherein each occurrence of $Q^{1a}$ independently is $C_{1-12}$ primary alkyl, or $C_{1-6}$ primary alkyl; each occurrence of $Q^{1b}$ independently is $C_{1-12}$ alkyl or $C_{6-12}$ aryl; or $C_{1-6}$ alkyl or phenyl; $Q^2$ is hydrogen; and $R^1$, $R^2$, $R^3$, and $R^4$ are each independently hydrogen, halogen, or $C_{1-12}$ alkyl; or hydrogen or $C_{1-6}$ alkyl, optionally wherein the capped poly(arylene ether) copolymer comprises at least one repeating unit wherein $Q^{1a}$ is the $C_{1-12}$ primary alkyl, and $Q^{1b}$ is the unsubstituted $C_{6-12}$ aryl; or wherein the capped poly(arylene ether) copolymer comprises at least one repeating unit wherein $Q^{1a}$ is $C_{1-6}$ primary alkyl, and $Q^{1b}$ is unsubstituted phenyl.

Aspect 5. The curable thermosetting composition of any one of aspect 3 or 4 wherein the capped poly(arylene ether) copolymer is of formula (2a) as provided herein.

Aspect 6. The curable thermosetting composition of any one of aspects 3 to 5, wherein the capped poly(arylene ether) copolymer is of formula (2b) as provided herein.

Aspect 7. The curable thermosetting composition of any one of the preceding aspects, further comprising one or more of a crosslinking agent, a curing agent, a curing catalyst, a curing initiator, or a combination thereof.

Aspect 8. The curable thermosetting composition of any one of the preceding aspects, further comprising one or more of a flame retardant, a filler, a coupling agent, or a combination thereof.

Aspect 9. A cured thermoset composition, comprising a cured product of the curable thermosetting composition of any one of the preceding aspects.

Aspect 10. A method for the manufacture of the cured thermoset composition of aspect 9, comprising curing the curable thermosetting composition, or at a temperature of 50 to 250° C.

Aspect 11. An article comprising the cured thermoset composition of aspect 9, wherein the article is a composite, a foam, a fiber, a layer, a coating, an encapsulant, an adhesive, a sealant, a molded component, a prepreg, a casing, a cast article, a laminate, or a combination thereof; or wherein the article is a metal clad laminate, an electronic composite, a structural composite, or a combination thereof.

Aspect 12. A varnish composition, comprising the curable thermosetting composition of any one of aspects 1 to 8; and a solvent.

Aspect 13. An article manufactured from the varnish composition of aspect 12, or wherein the article is a fiber, a layer, a coating, a cast article, a prepreg, a composite, or a laminate; or wherein the article is a metal clad laminate.

Aspect 14. A method for the manufacture of the article of aspect 13, comprising impregnating the varnish composition into a substrate to form a prepreg; and curing the varnish composition.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, or the like. The terms "a" and "an" and "the" do not denote a limitation of quantity and are to be construed to cover both the singular and the plural, unless otherwise indicated herein or clearly contradicted by context. "Or" means "and/or" unless clearly stated otherwise. It is to be understood that the described elements may be combined in any suitable manner in the various aspects. A "combination thereof" is open and includes any combination comprising at least one of the listed components or properties optionally together with a like or equivalent component or property not listed.

Unless defined otherwise, technical, and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference. Unless specified to the contrary herein, all test standards are the most recent standard in effect as of the filing date of this application, or, if priority is claimed, the filing date of the earliest priority application in which the test standard appears.

Unless otherwise indicated, compounds are described using standard nomenclature. The term "hydrocarbon" and "hydrocarbyl" refer to any compound, group, or substituent that includes carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like. As used herein the term "heterohydrocarbyl" refers to a hydrocarbyl that contains one or more heteroatoms within the backbone of the hydrocarbyl residue. "Aliphatic" means a non-aromatic hydrocarbon group; "aryl" means a mono- or polycyclic aromatic hydrocarbon group, wherein all ring members are carbon; "alkylaryl" means an aryl group substituted with an alkyl group; "arylalkyl" means an alkyl group substituted with an aryl group. The prefix "hetero" means that the compound or group includes at least one ring member that is a heteroatom (e.g., 1, 2, or 3 heteroatom(s)), wherein the heteroatom(s) are each independently N, O, S, Si, or P.

In the chemical formulas that are shown by structure, it is to be understood that any position not substituted by an indicated group has its valency filled by a bond as indicated or by a hydrogen atom. Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents that can each independently be a nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkyl (e.g., benzyl), $C_{7-12}$ alkylaryl (e.g., toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), instead of hydrogen, provided that the substituted atom's normal valence is not exceeded. The number of carbon atoms indicated in a group is exclusive of any substituents. For example $-CH_2CH_2CN$ is a $C_2$ alkyl group substituted with a nitrile.

The appended claims as filed and as they may be amended are intended to embrace alternatives, modifications, improvements, and substantial equivalents that are or may be presently unforeseen or that may arise to applicants or others skilled in the art.

What is claimed is:

1. A curable thermosetting composition comprising a capped poly(arylene ether) copolymer comprising a reactive end group, wherein the capped poly(arylene ether) copolymer is derived from an alkyl, aryl-phenol;

wherein the capped poly(arylene ether) copolymer is of formula (1) or formula (2):

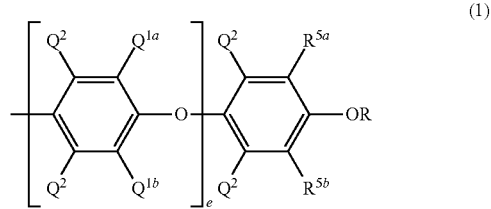

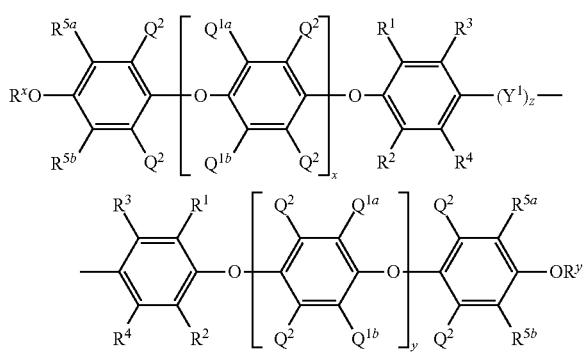

wherein
- each of $R^x$ and $R^y$ is independently a reactive end group comprising a (meth)acrylate, a (meth)acrylonitrile, a vinyl benzene, an allyl, an epoxide comprising a glycidyl ether, a cyanate ester, an amine, maleimide, a carboxylic acid, a carboxylic acid alkyl ester, or a combination thereof,
- each occurrence of $Q^{1a}$ and $Q^{1b}$ independently is halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;
- each occurrence of $Q^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;
- each occurrence of $R^1$, $R^2$, $R^3$, and $R^4$ is independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;
- x and y represent the relative mole ratios of the arylene ether units wherein x and y are each independently 0 to 50, or 0 to 30, provided that the sum of x and y is at least 2; or e is the number of moles of the arylene ether unit;
- each occurrence of $R^{5a}$ is independently $Q^{1a}$ or a ($C_{1-6}$-hydrocarbyl)($C_{1-6}$-hydrocarbyl)aminomethylene group;
- each occurrence of $R^{5b}$ is independently $Q^{1b}$ or a ($C_{1-6}$-hydrocarbyl)($C_{1-6}$-hydrocarbyl)aminomethylene group;
- provided that the capped poly(arylene ether) copolymer comprises:
  - at least one repeating unit wherein $Q^{1a}$ is a $C_{1-12}$ primary or secondary alkyl, and $Q^{1b}$ is unsubstituted $C_{6-12}$ aryl,
  - at least one terminal unit where $R^{5a}$ is a $C_{1-12}$ primary or secondary alkyl, and $R^{5b}$ is unsubstituted $C_{6-12}$ aryl, or
  - a combination thereof;
- $Y^1$ is a divalent linking group of any one or more of formulas $$-\underset{R^b}{\overset{R^a}{\underset{|}{\overset{|}{C}}}}-  \quad -\overset{O}{\overset{\|}{C}}- \quad -\overset{S}{\overset{\|}{C}}- \quad -\underset{}{\overset{R^e}{\underset{|}{N}}}- \quad -O-$$

$$-S- \quad -\overset{O}{\underset{O}{\overset{\|}{\underset{\|}{S}}}}- \quad -R^f\!\!\left[\underset{R^g}{\overset{R^g}{\underset{|}{\overset{|}{Si}}}}-O-\underset{R^g}{\overset{R^g}{\underset{|}{\overset{|}{Si}}}}\right]_{n'}\!\!R^f-$$

wherein
- each occurrence of $R^a$, $R^b$, and $R^e$ is independently hydrogen, $C_{1-12}$ hydrocarbyl, or $C_{1-6}$ hydrocarbylene, optionally wherein $R^a$ and $R^b$ together are a $C_{4-8}$ cycloalkylene group,
- each occurrence of $R^f$ is independently a $C_{1-6}$ hydrocarbylene group,
- each occurrence of $R^g$ is independently hydrogen, $C_{1-12}$ hydrocarbyl, or $C_{1-12}$ halohydrocarbyl, and
- n' is 5 to 50;
- z is 0 or 1; and
- each occurrence of R is independently $$-Y^2-R^{5a} \quad -Y^2-\overset{R^6}{\underset{R^8}{\overset{|}{\underset{|}{C}}}}\!\!=\!\!R^7 \quad -Y^2-\!\!\begin{array}{c}R^9\;\;R^{10}\\ \phantom{-}\\ \phantom{-} \\ R^{13}\;\;R^{12}\end{array}\!\!R^{11}$$

wherein
$Y^2$ is a divalent linking group having one of formulas $$-\overset{O}{\overset{\|}{C}}- \quad -\overset{S}{\overset{\|}{C}}- \quad -\underset{R^d}{\overset{R^c}{\underset{|}{\overset{|}{C}}}}- \quad -\overset{O}{\overset{\|}{S}}- \quad -\overset{O}{\underset{O}{\overset{\|}{\underset{\|}{S}}}}-$$

wherein
- each occurrence of $R^c$ and $R^d$ independently is hydrogen or $C_{1-12}$ alkyl,
- $R^5$ is an epoxide-containing group, a cyanate-containing group, or a $C_{1-12}$ hydrocarbyl optionally substituted with one or two carboxylic acid groups,
- each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid, and
- each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester, provided that the capped poly(arylene ether) copolymer comprises: at least one repeating unit, wherein Q1a is a C1-12 primary or secondary alkyl, and Q1b is unsubstituted C6-12 aryl.

2. The curable thermosetting composition of claim 1, wherein the capped poly (arylene ether) copolymer is derived from a reaction of the copolymerization of bisphenol A and 2-methyl-6-phenylphenol to form an uncapped poly (arylene ether) copolymer, and capping of the uncapped poly (arylene ether) copolymer with methacrylic anhydride to form the capped poly (arylene ether) copolymer.

3. The curable thermosetting composition of claim 1, wherein
- each occurrence of $Q^{1a}$ independently is $C_{1-12}$ primary alkyl, or $C_{1-6}$ primary alkyl;
- each occurrence of $Q^{1b}$ independently is $C_{1-12}$ alkyl or $C_{6-12}$ aryl; or $C_{1-6}$ alkyl or phenyl;
- $Q^2$ is hydrogen; and
- $R^1$, $R^2$, $R^3$, and $R^4$ are each independently hydrogen, halogen, or $C_{1-12}$ alkyl; or hydrogen or $C_{1-6}$ alkyl,
- optionally wherein the capped poly (arylene ether) copolymer comprises at least one repeating unit wherein $Q^{1a}$ is the $C_{1-12}$ primary alkyl, and $Q^{1b}$ is the unsubstituted $C_{6-12}$ aryl; or wherein the capped poly (arylene ether) copolymer comprises at least one repeating unit wherein $Q^{1a}$ is $C_{1-6}$ primary alkyl, and $Q^{1b}$ is unsubstituted phenyl.

4. The curable thermosetting composition of claim 1 wherein the capped poly (arylene ether) copolymer is of formula (2a):

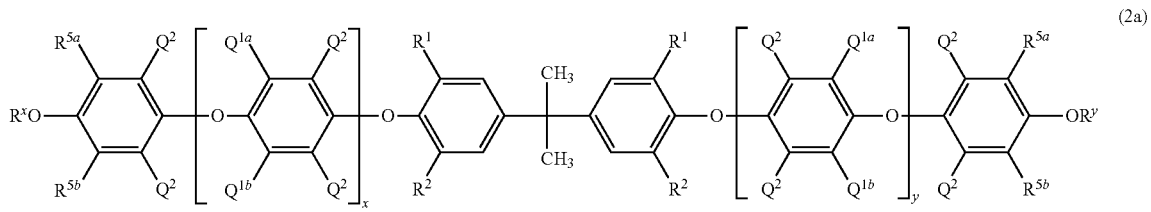

(2a)

wherein $Q^{1a}$, $Q^{1b}$, $Q^2$, $R^1$, $R^2$, $R^{5a}$, $R^{5b}$, $R^x$, $R^y$, x, and y are as defined in claim 1.

5. The curable thermosetting composition of claim 1, wherein the capped poly (arylene ether) copolymer is of formula (2b):

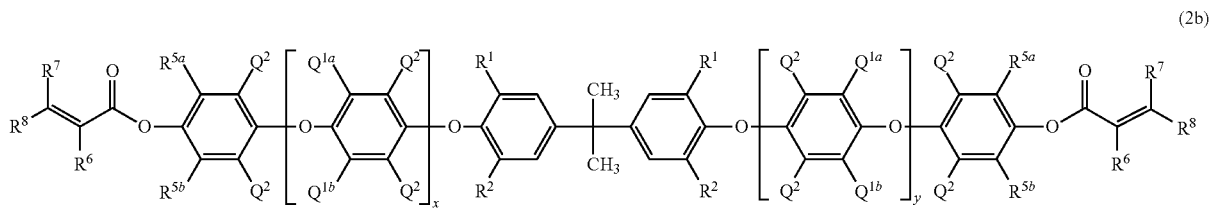

(2b)

wherein $R^1$, $R^2$, $R^6$ to $R^8$, $R^{5a}$, $R^{5b}$, $Q^{1a}$, $Q^{1b}$, $Q^2$, x, and y are as defined in claim 1.

6. The curable thermosetting composition of claim 1, further comprising one or more of a crosslinking agent, a curing agent, a curing catalyst, a curing initiator, or a combination thereof.

7. The curable thermosetting composition of claim 1, further comprising one or more of a flame retardant, a filler, a coupling agent, or a combination thereof.

8. A cured thermoset composition, comprising a cured product of the curable thermosetting composition of claim 1.

9. A method for the manufacture of the cured thermoset composition of claim 8, comprising curing the curable thermosetting composition, or at a temperature of 50 to 250° C.

10. An article comprising the cured thermoset composition of claim 8, wherein the article is a composite, a foam, a fiber, a layer, a coating, an encapsulant, an adhesive, a sealant, a molded component, a prepreg, a casing, a cast article, a laminate, or a combination thereof;

or wherein the article is a metal clad laminate, an electronic composite, a structural composite, or a combination thereof.

11. A varnish composition, comprising the curable thermosetting composition of claim 1; and a solvent.

12. An article manufactured from the varnish composition of claim 11, or wherein the article is a fiber, a layer, a coating, a cast article, a prepreg, a composite, or a laminate; or wherein the article is a metal clad laminate.

13. A method for the manufacture of the article of claim 12, comprising impregnating the varnish composition into a substrate to form a prepreg; and curing the varnish composition.

* * * * *